United States Patent
Takagi et al.

(10) Patent No.: US 7,797,553 B2
(45) Date of Patent: Sep. 14, 2010

(54) MEMORY DEVICE

(75) Inventors: Yoshihiko Takagi, Tokyo (JP);
Takafumi Kikuchi, Tokyo (JP)

(73) Assignee: Panasonic Corporation, Osaka (JP)

( * ) Notice: Subject to any disclaimer, the term of this patent is extended or adjusted under 35 U.S.C. 154(b) by 1144 days.

(21) Appl. No.: 10/782,556

(22) Filed: Feb. 19, 2004

(65) Prior Publication Data
US 2004/0165413 A1 Aug. 26, 2004

(30) Foreign Application Priority Data
Feb. 20, 2003 (JP) .............................. 2003-042288

(51) Int. Cl.
*G11C 11/00* (2006.01)

(52) U.S. Cl. ...................... 713/194; 713/193; 713/189; 726/22; 726/27; 726/34

(58) Field of Classification Search ................. 713/194
See application file for complete search history.

(56) References Cited

U.S. PATENT DOCUMENTS

| | | | | |
|---|---|---|---|---|
| 4,853,522 | A * | 8/1989 | Ogasawara | 235/380 |
| 5,479,638 | A * | 12/1995 | Assar et al. | 711/103 |
| 5,845,066 | A * | 12/1998 | Fukuzumi | 726/19 |
| 5,892,900 | A * | 4/1999 | Ginter et al. | 726/26 |
| 5,892,979 | A * | 4/1999 | Shiraki et al. | 710/52 |
| 6,175,924 | B1 * | 1/2001 | Arnold | 713/189 |
| 6,175,925 | B1 * | 1/2001 | Nardone et al. | 726/22 |
| 6,205,550 | B1 * | 3/2001 | Nardone et al. | 726/22 |
| 7,162,645 | B2 * | 1/2007 | Iguchi et al. | 713/193 |
| 2002/0049746 | A1 * | 4/2002 | De Roose | 707/1 |
| 2002/0169960 | A1 * | 11/2002 | Iguchi et al. | 713/174 |
| 2003/0033537 | A1 * | 2/2003 | Fujimoto et al. | 713/193 |
| 2003/0223871 | A1 * | 12/2003 | Schmaling et al. | 416/107 |
| 2004/0093505 | A1 * | 5/2004 | Hatakeyama et al. | 713/189 |
| 2004/0177269 | A1 * | 9/2004 | Belnet et al. | 713/200 |
| 2004/0215755 | A1 * | 10/2004 | O'Neill | 709/223 |
| 2006/0200864 | A1 * | 9/2006 | Nakanishi et al. | 726/27 |

FOREIGN PATENT DOCUMENTS

| | | |
|---|---|---|
| EP | 1 050 887 | 11/2000 |
| JP | 2000-11101 | 1/2000 |

OTHER PUBLICATIONS

Rankl et al., "Handbuch der Chiparten", Carl Hanser Verlag, 2002, pp. 253-256 (Cited on ESR, English Translation).

* cited by examiner

*Primary Examiner*—Kambiz Zand
*Assistant Examiner*—Yonas Bayou
(74) *Attorney, Agent, or Firm*—Pearne & Gordon LLP

(57) ABSTRACT

The present invention provides a memory device that can safely hold much data necessary for using an Application (AP) therein. In the present invention, a memory device includes a first tamper resistant memory 41 that cannot be accessed directly by an electronic device and a second non-tamper resistant memory that cannot be directly accessed by the electronic device. The second memory is used to save data stored in the first memory 41 to. In this memory device, since data necessary for using many APs can be safely held in the device, any terminal device satisfying authorizing conditions can use the data held therein.

13 Claims, 24 Drawing Sheets

FIG. 4

| | AP IDENTIFIER | INSTALL FLAG | CODE ADDRESS | DATA ADDRESS | SAVABLE OR NOT SAVABLE |
|---|---|---|---|---|---|
| #1 | AP IDENTIFIER | INSTALL FLAG | CODE ADDRESS | DATA ADDRESS | SAVABLE OR NOT SAVABLE |
| #2 | AP IDENTIFIER | INSTALL FLAG | CODE ADDRESS | DATA ADDRESS | SAVABLE OR NOT SAVABLE |
| #3 | AP IDENTIFIER | INSTALL FLAG | CODE ADDRESS | DATA ADDRESS | SAVABLE OR NOT SAVABLE |
| #4 | AP IDENTIFIER | INSTALL FLAG | CODE ADDRESS | DATA ADDRESS | SAVABLE OR NOT SAVABLE |
| #5 | AP IDENTIFIER | INSTALL FLAG | CODE ADDRESS | DATA ADDRESS | |

FIG. 5

| AP IDENTIFIER | SAVED DATA IDENTIFIER | SIGNATURE DATA |
|---|---|---|
| AP IDENTIFIER | SAVED DATA IDENTIFIER | SIGNATURE DATA |
| AP IDENTIFIER | SAVED DATA IDENTIFIER | SIGNATURE DATA |
| AP IDENTIFIER | SAVED DATA IDENTIFIER | SIGNATURE DATA |

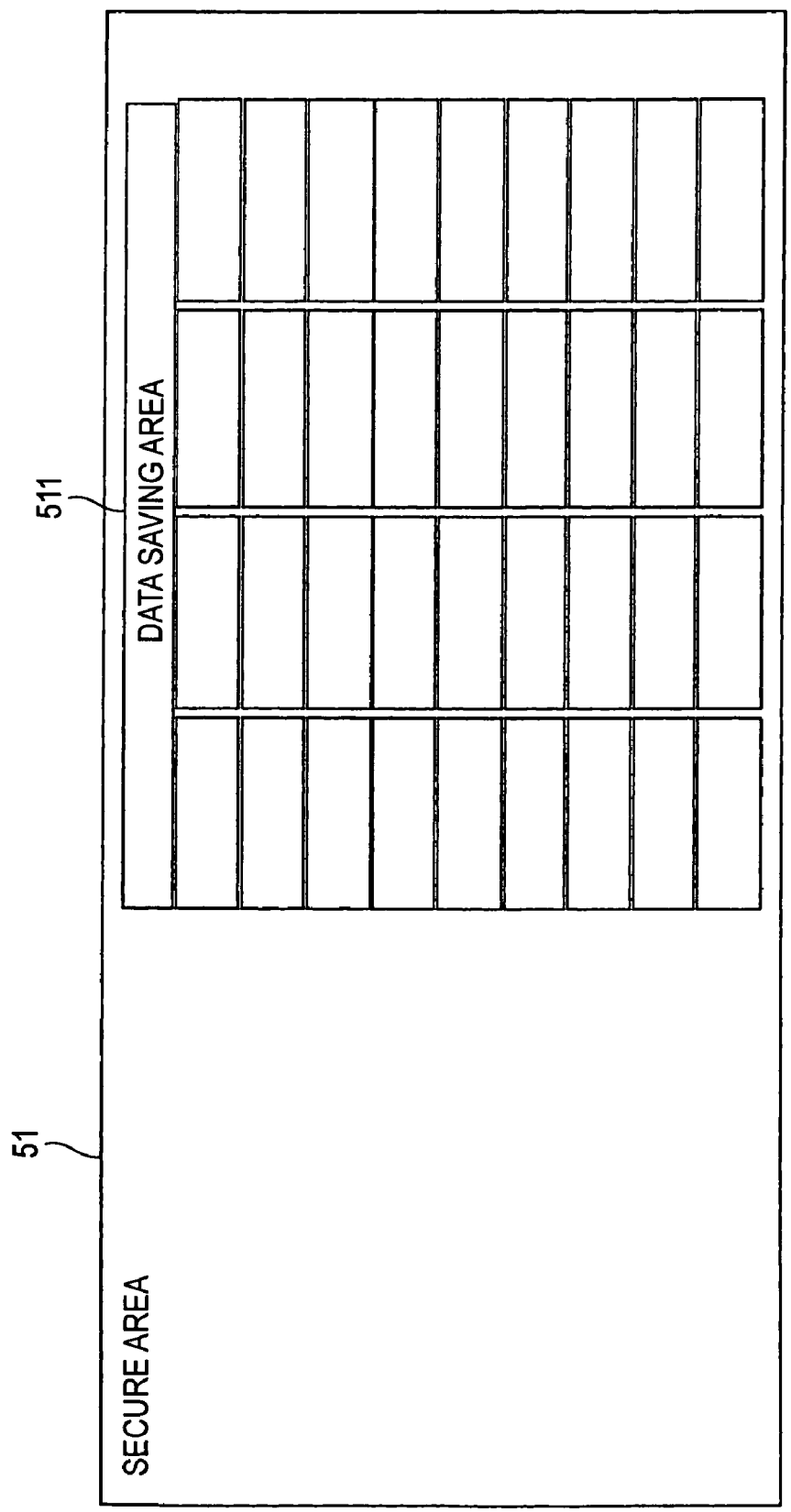

FIG. 13A

| #1 | NULL | NULL | NULL | NULL | NULL |
|---|---|---|---|---|---|
| #2 | NULL | NULL | NULL | NULL | NULL |
| #3 | NULL | NULL | NULL | NULL | NULL |
| #4 | NULL | NULL | NULL | NULL | NULL |
| #5 | NULL | NULL | NULL | NULL | NULL |

FIG. 13B

| #1 | AP1 | NO | CODE1 | NULL | YES |
|---|---|---|---|---|---|
| #2 | NULL | NULL | NULL | NULL | NULL |
| #3 | NULL | NULL | NULL | NULL | NULL |
| #4 | NULL | NULL | NULL | NULL | NULL |
| #5 | NULL | NULL | NULL | NULL | NULL |

FIG. 13C

| #1 | AP1 | NO | CODE1 | NULL | YES |
|---|---|---|---|---|---|
| #2 | AP2 | NO | CODE2 | NULL | YES |
| #3 | NULL | NULL | NULL | NULL | NULL |
| #4 | NULL | NULL | NULL | NULL | NULL |
| #5 | NULL | NULL | NULL | NULL | NULL |

FIG. 14A

| #1 | AP1 | YES | CODE1 | DATA1 | YES |
|---|---|---|---|---|---|
| #2 | AP2 | YES | CODE2 | DATA2 | YES |
| #3 | NULL | NULL | NULL | NULL | NULL |
| #4 | NULL | NULL | NULL | NULL | NULL |
| #5 | NULL | NULL | NULL | NULL | NULL |

FIG. 14B

| #1 | AP1 | YES | CODE1 | DATA1 | YES |
|---|---|---|---|---|---|
| #2 | AP2 | YES | CODE2 | DATA2 | YES |
| #3 | AP3 | YES | CODE3 | DATA3 | NO |
| #4 | AP4 | YES | CODE4 | DATA4 | YES |
| #5 | AP5 | YES | CODE5 | DATA5 | YES |

FIG. 15A

| #1 | AP1 | YES | CODE1 | DATA1 | YES |
|---|---|---|---|---|---|
| #2 | NULL | NULL | NULL | NULL | NULL |
| #3 | AP3 | YES | CODE3 | DATA3 | NO |
| #4 | AP4 | YES | CODE4 | DATA4 | YES |
| #5 | AP5 | YES | CODE5 | DATA5 | YES |

FIG. 15B

| #1 | AP1 | YES | CODE1 | DATA1 | YES |
|---|---|---|---|---|---|
| #2 | AP6 | NO | CODE6 | NULL | NO |
| #3 | AP3 | YES | CODE3 | DATA3 | NO |
| #4 | AP4 | YES | CODE4 | DATA4 | YES |
| #5 | AP5 | YES | CODE5 | DATA5 | YES |

FIG. 15C

| #1 | AP1 | YES | CODE1 | DATA1 | YES |
|---|---|---|---|---|---|
| #2 | AP6 | NO | CODE6 | NULL | NO |
| #3 | AP3 | YES | CODE3 | DATA3 | NO |
| #4 | AP2 | YES | CODE7 | DATA7 | YES |
| #5 | AP5 | YES | CODE5 | DATA3 | YES |

FIG. 16A

| NULL | NULL | NULL |
|------|------|------|
| NULL | NULL | NULL |
| NULL | NULL | NULL |
| NULL | NULL | NULL |

FIG. 16B

| AP2  | EVAC2 | SIGN2 |
|------|-------|-------|
| NULL | NULL  | NULL  |
| NULL | NULL  | NULL  |
| NULL | NULL  | NULL  |

FIG. 16C

| AP2  | EVAC2 | SIGN2 |
|------|-------|-------|
| AP4  | EVAC4 | SIGN4 |
| NULL | NULL  | NULL  |
| NULL | NULL  | NULL  |

FIG. 16D

| NULL | NULL  | NULL  |
|------|-------|-------|
| AP4  | EVAC4 | SIGN4 |
| NULL | NULL  | NULL  |
| NULL | NULL  | NULL  |

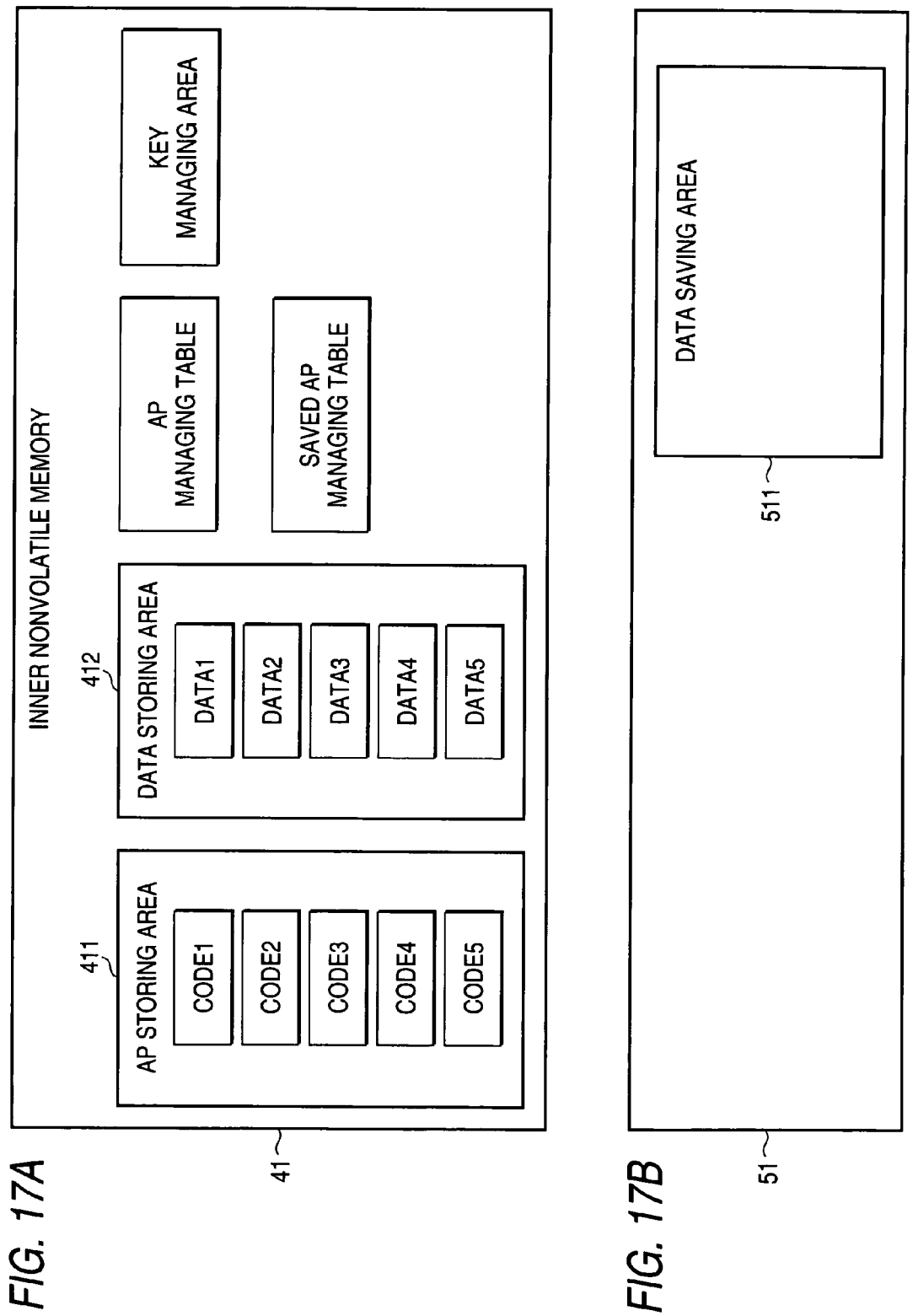

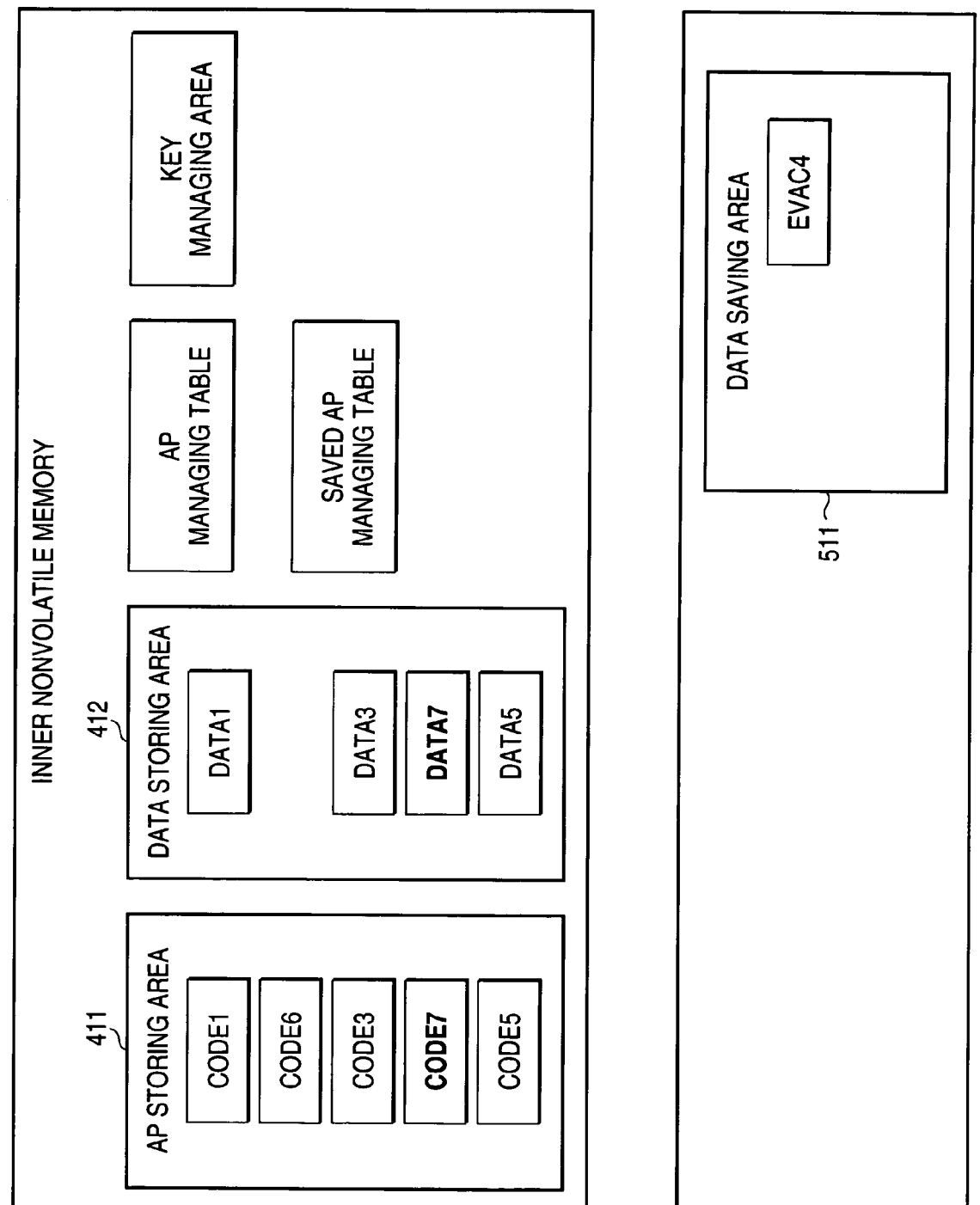

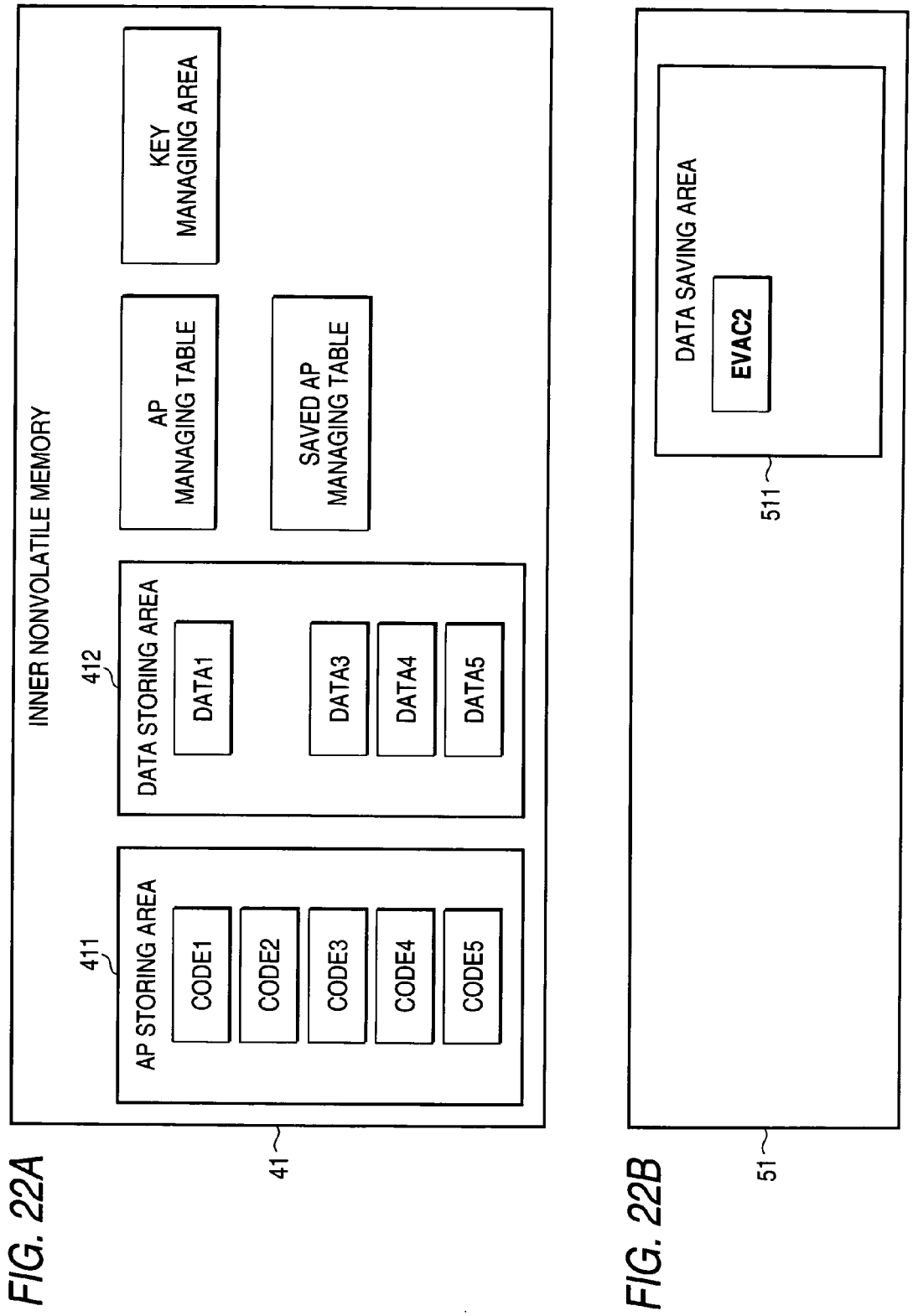

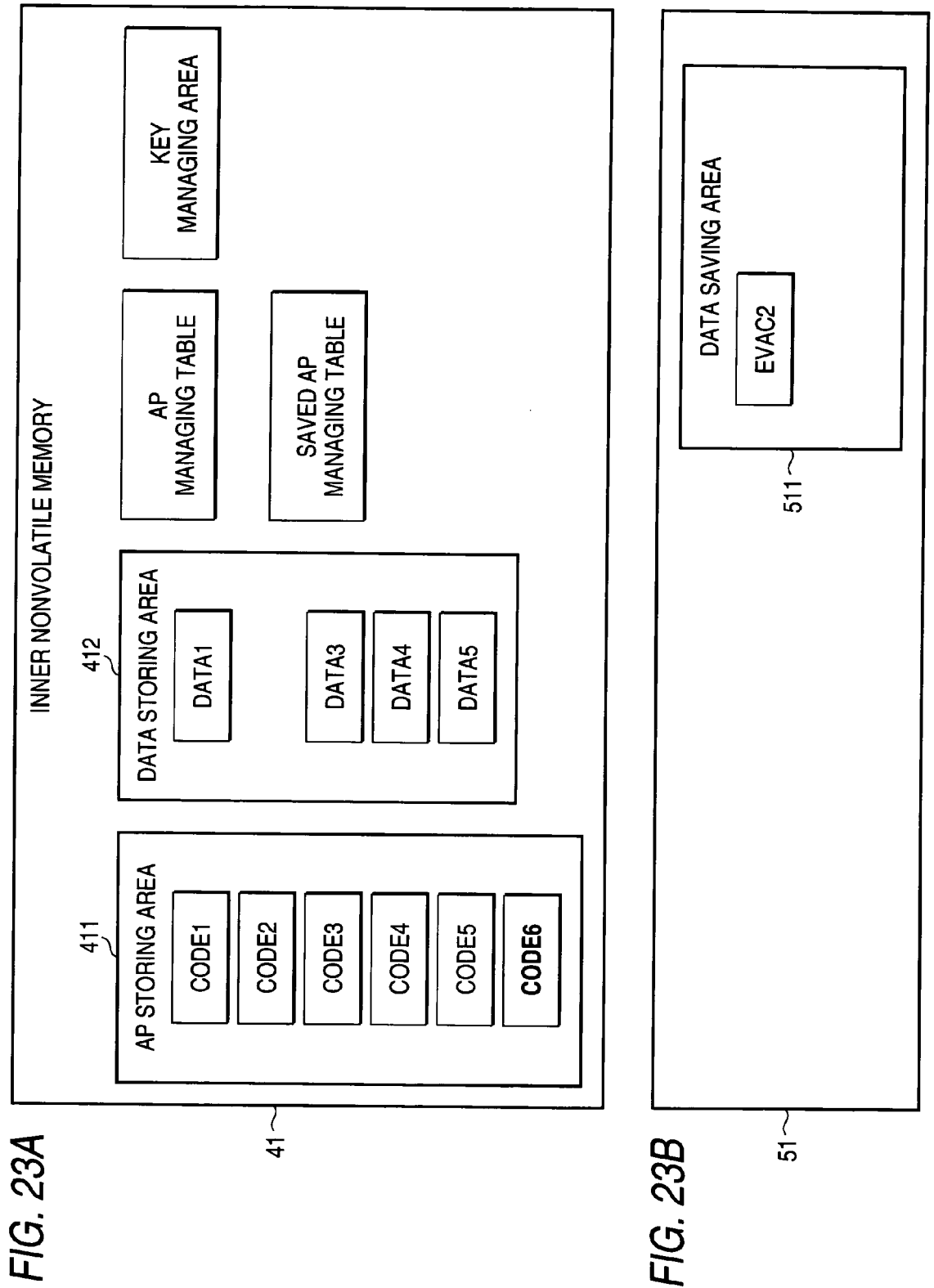

| | AP IDENTIFIER | INSTALL FLAG | CODE ADDRESS | DATA ADDRESS | SAVABLE OR NOT SAVABLE |
|---|---|---|---|---|---|
| #1 | AP IDENTIFIER | INSTALL FLAG | CODE ADDRESS | DATA ADDRESS | SAVABLE OR NOT SAVABLE |
| #2 | AP IDENTIFIER | INSTALL FLAG | CODE ADDRESS | DATA ADDRESS | SAVABLE OR NOT SAVABLE |
| #3 | AP IDENTIFIER | INSTALL FLAG | CODE ADDRESS | DATA ADDRESS | SAVABLE OR NOT SAVABLE |
| #4 | AP IDENTIFIER | INSTALL FLAG | CODE ADDRESS | DATA ADDRESS | SAVABLE OR NOT SAVABLE |
| #5 | AP IDENTIFIER | INSTALL FLAG | CODE ADDRESS | DATA ADDRESS | SAVABLE OR NOT SAVABLE |

413

| | AP IDENTIFIER | STORING ADDRESS | SIGNATURE DATA | SAVABLE OR NOT SAVABLE |
|---|---|---|---|---|
| #1 | AP IDENTIFIER | STORING ADDRESS | SIGNATURE DATA | SAVABLE OR NOT SAVABLE |
| #2 | AP IDENTIFIER | STORING ADDRESS | SIGNATURE DATA | SAVABLE OR NOT SAVABLE |
| #3 | AP IDENTIFIER | STORING ADDRESS | SIGNATURE DATA | SAVABLE OR NOT SAVABLE |
| #4 | AP IDENTIFIER | STORING ADDRESS | SIGNATURE DATA | SAVABLE OR NOT SAVABLE |
| #5 | AP IDENTIFIER | STORING ADDRESS | SIGNATURE DATA | SAVABLE OR NOT SAVABLE |
| #6 | AP IDENTIFIER | STORING ADDRESS | SIGNATURE DATA | SAVABLE OR NOT SAVABLE |

PERMISSION DESIGNATING TABLE

| ALL DATA MANAGED BY A CERTAIN AP ||
|---|---|
| DATA | PERMITTED AP |
| DATA | PERMITTED AP |
| DATA | PERMITTED AP |
| ... | PERMITTED AP |

FIG. 26B

EXAMPLE OF USE

| ALL DATA MANAGED BY AP2 ||
|---|---|
| data_a | AP1 |
| data_b | NULL |
| data_c | AP3 |
| ... | ... |

FIG. 27A

PERMISSION DESIGNATING TABLE

| ALL CODES OF A CERTAIN AP ||
|---|---|
| CODE | PERMITTED AP |
| CODE | PERMITTED AP |
| CODE | PERMITTED AP |
| ... | PERMITTED AP |

FIG. 27B

EXAMPLE OF USE

| ALL CODES OF AP2 ||
|---|---|
| code_a | AP1 |
| code_b | NULL |
| code_c | AP3 |
| ... | ... | and management

MEMORY DEVICE

BACKGROUND OF THE INVENTION

1. Field of the Invention

The present invention relates to a memory device such as a semiconductor memory card, and more particularly to a memory device capable of effectively utilizing an area with secrecy.

2. Description of the Related Art

In recent years, an IC card that has been extensively used in an electronic business or the like has a memory area in a tamper resistant module. Accordingly, the IC card can securely secretly keep data and has a firm resistance for copy or forgery. However, since the memory area of the IC card has only a small memory capacity as low as several ten-kilo bytes, a large quantity of data cannot be stored.

A technique that an application program (refer it to as an "AP", hereinafter) stored in the IC card is temporarily saved in a terminal device and the IC card is effectively utilized is disclosed in a Patent Document 1 described below. This IC card generates and manages an encryption key to encode the AP to be saved and then save the encoded AP in the terminal device. To recover the saved AP, the AP received from the terminal device is decoded with the managed encryption key to restore the AP in the memory area of the IC card. For example, the technique is disclosed in a patent reference 1 (JP-A-2000-11101).

However, when the AP stored in the IC card is saved in a terminal device A, if the AP is to be used by a terminal device B except the terminal device A, the terminal device A needs to be connected to the IC card. The saved AP needs to be restored in a memory area in the IC card. After that, the terminal device B needs to be connected to the IC card. Otherwise, the AP saved in the terminal device A needs to be moved to the terminal device B through a network or the like. Then, the terminal device B needs to be connected to the IC card. That is, when the AP is saved outside the IC card, if the AP is used by the terminal device B except the terminal device A in which the AP is saved, an extremely troublesome procedure will be inconveniently required.

SUMMARY OF THE INVENTION

The present invention solves the above-described problems and aims to provide a memory device capable of safely holding therein a large quantity of data necessary for using an AP by efficiently utilizing an area having secrecy.

A memory device according to the present invention includes a first tamper resistant memory which cannot be accessed directly from an electronic device and a second non-tamper resistant memory which cannot be directly accessed from the electronic device. Data stored in the first memory is saved to the second memory.

In the memory device, since a lot of data necessary for using many APs can be safely held in the device, any terminal that satisfies authorization conditions can employ the data held therein.

BRIEF DESCRIPTION OF THE DRAWINGS

FIG. 4 is a view showing the structure of an AP managing table of the secure card according to the first embodiment of the present invention;

FIG. 5 is a view showing the structure of a saved AP managing table of the secure card according to the first embodiment of the present invention;

FIG. 6 is a view showing the structure of a secure area of the secure card according to the first embodiment of the present invention;

FIGS. 13A, 13B, 13C are views showing the transitions of the AP managing table of the secure card in the first embodiment of the present invention;

FIGS. 14A and 14B are views showing the transitions of the AP managing table of the secure card in the first embodiment of the present invention;

FIGS. 15A, 15B, and 15C are views showing the transitions of the AP managing table of the secure card in the first embodiment of the present invention;

FIGS. 16A, 16B, 16C, and 16D are views showing the transitions of the saved AP managing table of the secure card in the first embodiment of the present invention;

FIGS. 17A and 17B are views showing the transitions of the inner nonvolatile memory and the secure area of the secure card in the first embodiment of the present invention

FIGS. 21A and 21B are views showing the transitions of the inner nonvolatile memory and the secure area of the secure card in the first embodiment of the present invention;

FIGS. 22A and 22B are views showing the transitions of the inner nonvolatile memory and the secure area of the secure card in the first embodiment of the present invention;

FIGS. 23A and 23B are views showing the transitions of the inner nonvolatile memory and the secure area of the secure card in the first embodiment of the present invention;

FIG. 25 is a view showing the structure of the AP managing table of the secure card in the second embodiment of the present invention;

FIGS. 26A and 26B are views showing a data reference permission designating table of a secure card according to a third embodiment of the present invention; and FIGS. 27A and 27B are views showing a code use permission designating table of the secure card in the third embodiment of the present invention.

Figure 1:
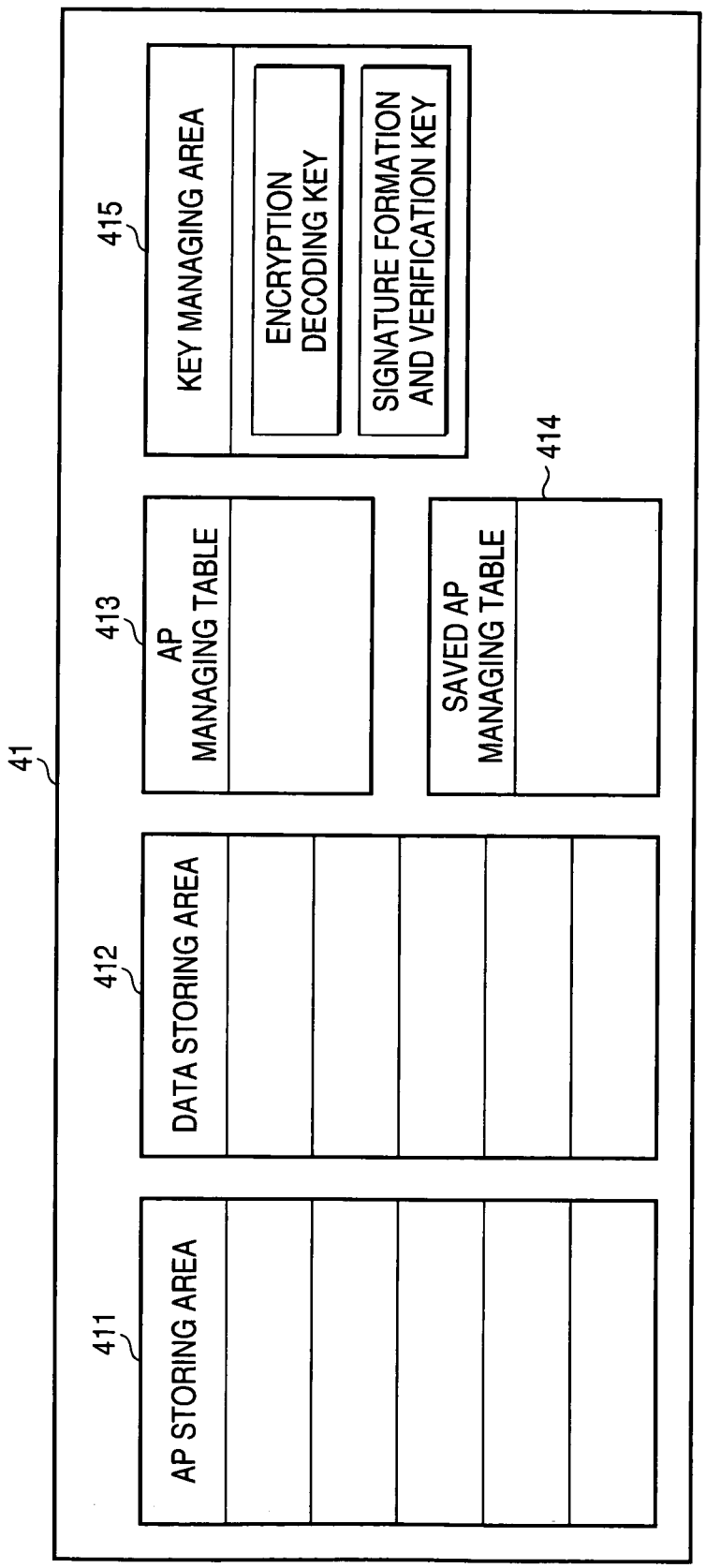
FIG. 1 is a view showing the structure of an inner nonvolatile memory of a secure card according to a first embodiment of the present invention.

In the drawings, a reference numeral 10 refers to a secure memory card; 11 to an IC part; 12 to an I/F part; 13 to an IC command processing part; 14 to a file managing part; 15 to an IC authorizing part; 16 to a memory managing part; 17 to an encoding and decoding circuit; 18 to an inner nonvolatile memory I/F part; 20 to a control part; 21 to a data I/F part; 22 to a command I/F part; 23 to a control authorizing part; 24 to a command processing part; 25 to an access control part; 26 to a large capacity nonvolatile memory I/F part; 40 to a TRM; 41 to an inner nonvolatile memory; 50 to a large capacity nonvolatile memory; 51 to a secure area; 52 to an authorized area; 53 to a non-authorized area; 60 to an external CPU; 411 to an AP storing area; 412 to a data storing area; 413 to an AP managing table; 414 to a saved AP managing table; 415 to a key managing area; 416 to a secure area downloaded AP managing table; 511 to a data saving area; and 512 to a AP storing area.

DETAILED DESCRIPTION OF THE PREFERRED EMBODIMENTS

Figure 2:
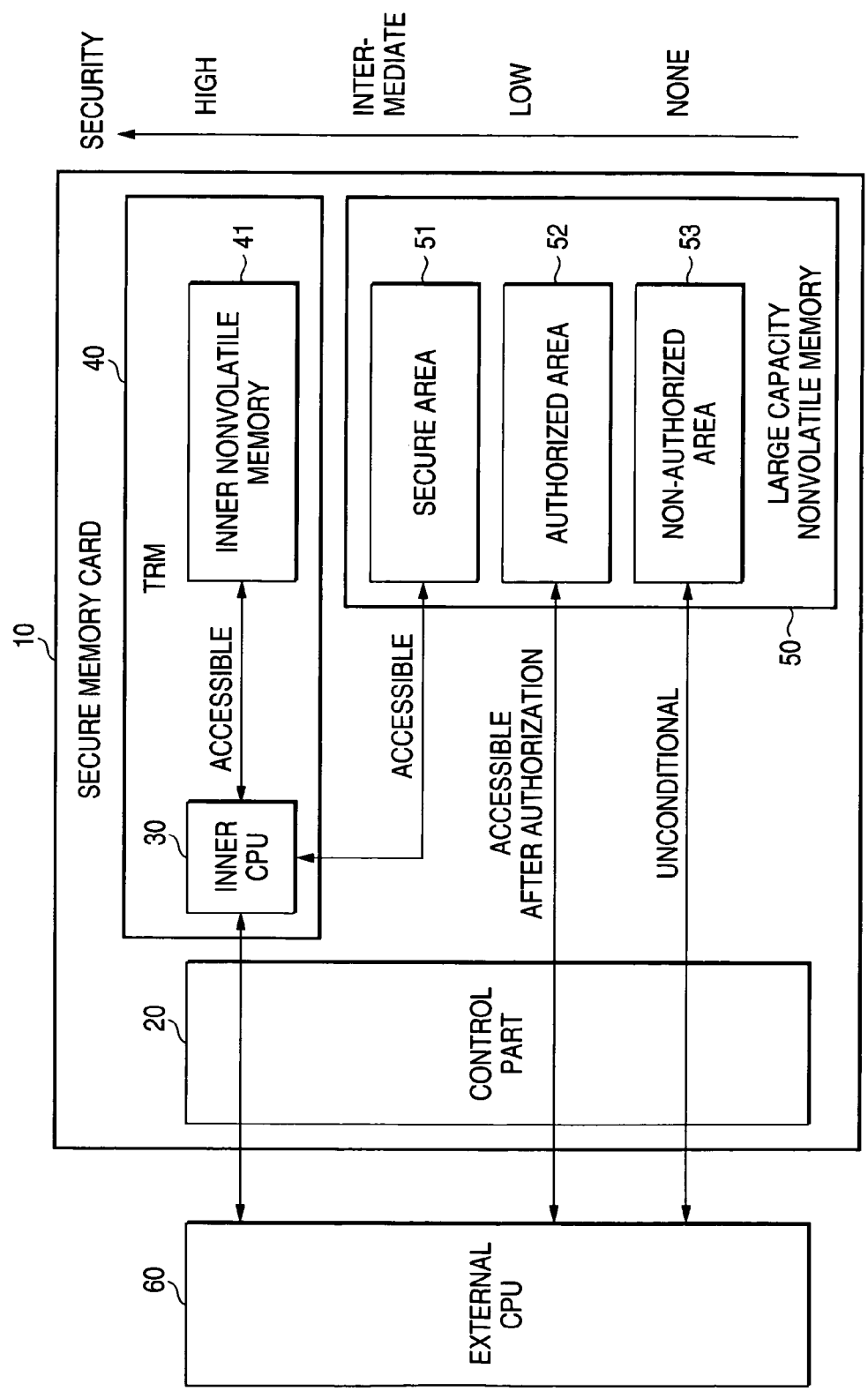
FIG. 2 is a schematic view of the secure card according to the first embodiment of the present invention.

As shown in a conceptual view in FIG. 2, a semiconductor memory card (here, it is called a "secure memory card") in an embodiment of the present invention includes a tamper resistant module (TRM) 40 having an inner CPU 30 and an inner nonvolatile memory 41, a large capacity nonvolatile memory 50 having a non-authorized area 53, an authorized area 52, and a secure area 51. The secure memory card further includes a control part 20 for communicating with an external CPU 60 of a terminal device (read/write (R/W) device) to control an access to a memory area by the terminal device.

The inner CPU 30 is the only part capable of accessing the inner nonvolatile memory 41 and the secure area 51. The terminal device cannot directly access the inner nonvolatile memory 41 and the secure area 51. Further, the control part 20 performs an authorization process of the terminal device to permit the authorized external CPU 60 to access the authorized area 52. On the other hand, the terminal device can unconditionally access the non-authorized area 53.

The nonvolatile memory 41 of the TRM 40 is composed is of an EEPROM capable of erasing and writing data, for instance, for each 16-byte unit. The large capacity nonvolatile memory 50 is composed of a flash memory capable of erasing data, for instance, for each block unit of 512 bytes or the like and writing data for each one-byte unit.

The external CPU 60 can unconditionally access the non-authorized area 53. Further, when the external CPU is authorized in the control part 20, the external CPU 60 can access the authorized area 52. However, the external CPU 60 cannot know the existence of the secure area 51 and the inner nonvolatile memory 41 and cannot directly access them.

Only the inner CPU 30 can access the secure area 51 and the inner nonvolatile memory 41. The difference between the secure area 51 and the inner nonvolatile memory 41 resides in that while the inner nonvolatile memory 41 is provided in the TRM 40, the secure area 51 is provided in the large capacity nonvolatile memory 50 having no tamper resistance. Therefore, the secure area 51 can have a storage capacity larger than that of the inner nonvolatile memory 41. On the contrary, the security level of the secure area 51 is lower than that of the inner nonvolatile memory 41 provided in the TRM 40. The security level of the non-authorized area 53 is the lowest among those of the four areas. The security levels become higher in order of the authorized area 52, the secure area 51 and the inner nonvolatile memory 41.

Figure 3:
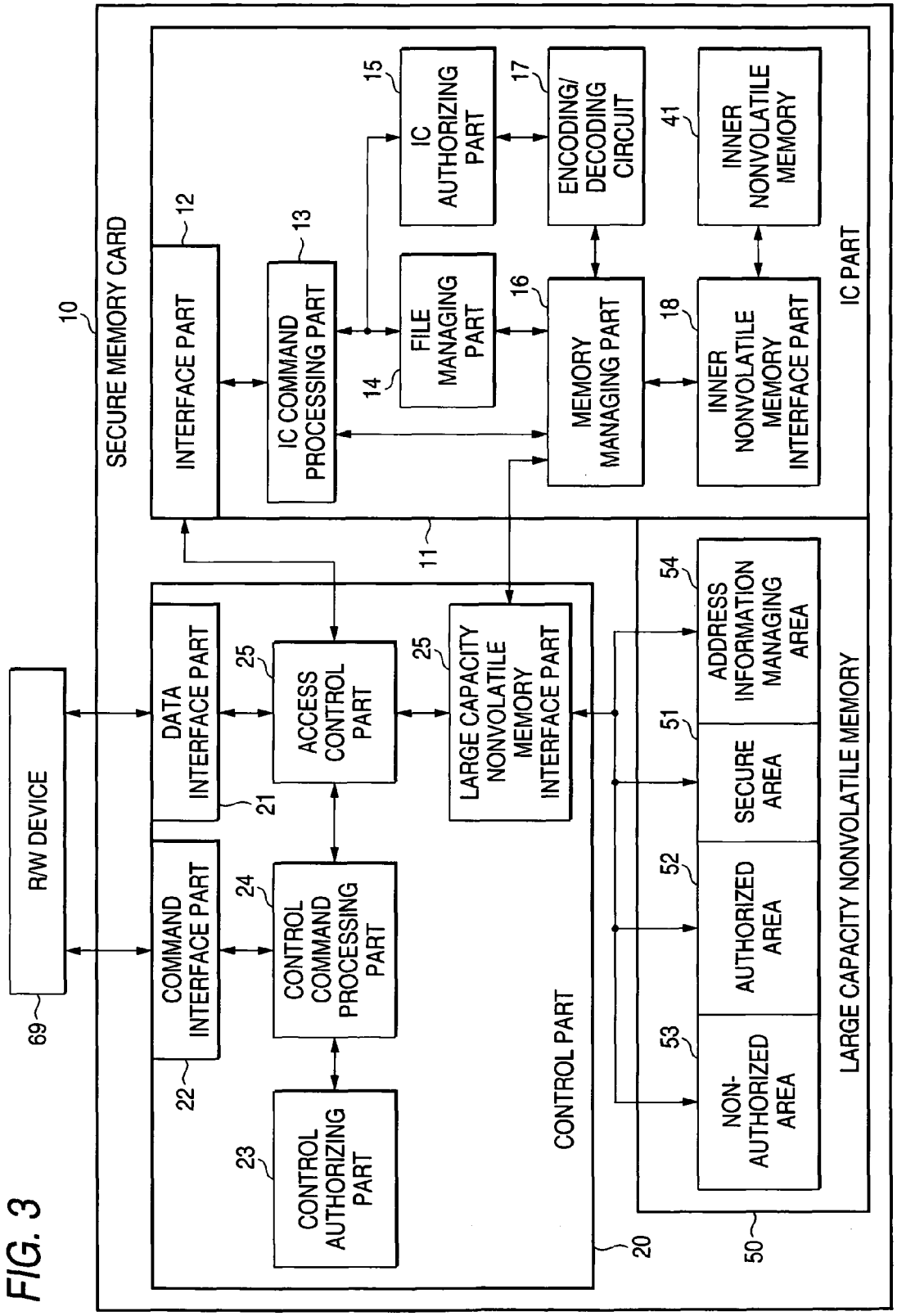
FIG. 3 is a block diagram showing the structure of the secure card according to the fist embodiment of the present invention.

A block diagram of FIG. 3 shows the structure of a secure memory card 10. The secure memory card 10 generally comprises the control part 20, the large capacity nonvolatile memory 50 and an IC part 11 corresponding to the TRM 40 in FIG. 2. The large capacity nonvolatile memory 50 includes the non-authorized area 53, the authorized area 52, the secure area 51 and an address information managing area 54 in which the address information of these areas is stored.

The control part 20 includes a data I/F part 21 for transmitting and receiving data between an R/W device 69 and the data I/F part, a command I/F part 22 for transmitting and receiving a command between the R/W device 69 and the command I/F part, a control authorizing part 23 for authorizing the R/W device 69, a control command processing part 24 for interpreting the received command and performing a process corresponding to the command, an access control part 25 for controlling an access to the large capacity nonvolatile memory 50 and serving as a window for receiving and transmitting data between the IC part 11 and the control part and a large capacity nonvolatile memory I/F part 26 for transmitting and receiving data between the large capacity nonvolatile memory 50 and the large capacity nonvolatile memory I/F part.

Further, the tamper resistant IC part 11 includes the inner nonvolatile memory 41, an I/F part 12 for transmitting and receiving data or a command between the control part 20 and the I/F part 12, an IC command processing part 13 for interpreting the command and performing a process corresponding to the command, a file managing part 14 for managing the data stored in the inner nonvolatile memory 41 and the secure area 51 in a file form, an IC authorizing part 15 for authorizing the R/W device 69 and permitting the authorized R/W device 69 to access the data of the inner nonvolatile memory 41 and the secure area 51, an encoding/decoding circuit 17 for encoding/decoding data written/read in the inner nonvolatile memory 41 and the secure area 51 by using a key stored in the inner nonvolatile memory 41, a memory managing part 16 for managing the inner nonvolatile memory 41 and the secure area 51 and an inner nonvolatile memory I/F part 18 for transmitting data to and receiving data from the inner nonvolatile memory 41.

The control command processing part 24 of the control part 20 interprets the command received from the R/W device 69. Then, the control command processing part 24 decides whether the command requests an access to the authorized area 52 or the non-authorized area 53 of the large capacity nonvolatile memory 50 or requests an authorization or requests a process by the IC part 11. When the command request the access to the authorized area 52 or the non-authorized area 53 of the large capacity nonvolatile memory 50, the control command processing part 24 instructs the access control part 25 to control an access to the large capacity nonvolatile memory 50. When the command request the process by the IC part 11, the control command processing part 24 instructs the access control part 25 to transfer the command to the IC part 11. Further, when the command requests the authorization, the control command processing part instructs the control authorizing part 23 to perform an authorizing process.

When the access control part 25 controls the access to the large capacity nonvolatile memory 50, the access control part 25 refers to the address information recorded in the address information managing area 54 of the large capacity nonvolatile memory 50. The terminal device (R/W device 69) designates the logic address of the large capacity nonvolatile memory 50 to request an access thereto. At this time, the access control part 25 decides to which area of the large capacity nonvolatile memory 50 the designated address belongs from the record of the address information managing area 54. For a request for an access to the authorized area 52, the access control part 25 permits only an authorized terminal device to access the authorized area 52.

Further, the IC command processing part 13 of the IC part 11 interprets the command transmitted from the control part 20. Then, the IC command processing part 13 decides whether a processing request requests data to be written/read in the inner nonvolatile memory 41, requests data to be written/read in the secure area 51, requests an authorization or requests other process.

When the command requests the authorization, the IC command processing part 13 instructs the IC authorizing part 15 to authorize the R/W device 69

Further, the command is a command for requesting data to be written/read in the inner nonvolatile memory 41 or for requesting data to be written/read in the secure area 51. At this time, the IC command processing part 13 recognizes whether or not an authorization process is completed in the IC authorizing part 15. When the authorization process is completed, the IC command processing part 13 permits the request. When the request is a request for writing data, the IC command processing part 13 sends data to be written to which the information of a destination where the data is stored is added to the memory managing part 16.

The memory managing part 16 for managing the inner nonvolatile memory 41 and the secure area 51 encodes the data to be written in the encoding and decoding circuit 17. The memory managing part 16 adds a signature (an encryption key or a verification key used in this process is stored in the inner nonvolatile memory 41) to the data to be written. After that, the memory managing part writes the data to be written in the inner nonvolatile memory 41 in the inner nonvolatile memory 41 through the inner nonvolatile memory I/F part 18 to transmit the information of a writing position to the file managing part 14. Further, the memory managing part writes the data to be written in the secure area 51 in the secure area 51 of the large capacity nonvolatile memory 50 through the large capacity nonvolatile memory I/F part 26 to transmit the information of a writing position to the file managing part 14. The signature may be possibly held in the inner nonvolatile memory 41 separately from the encoded data.

The file managing part 14 manages files stored in the inner nonvolatile memory 41 and the secure area 51 on the basis of the information transmitted from the memory managing part 16.

Further, when the request is a request for reading data, the IC command processing part 13 asks the file managing part 14 the file position of data to be read and requests the memory managing part 16 to read the file.

When the memory managing part 16 reads the file from the inner nonvolatile memory 41 or the secure area 51, the memory managing part 16 verifies or decodes the signature of the data in the encoding and decoding circuit 17. Then, the file managing part 16 transmits the data to the IC command processing part 13.

The decoded data is supplied to the control part 20 and transmitted to the R/W device 69 from the data I/F part 21.

Further, the IC command processing part 13 performs a process for saving the data stored in the inner nonvolatile memory 41 in the secure area 51 to effectively utilize the inner nonvolatile memory 41 having a small memory capacity. Now, a saving process will be described in detail.

First Embodiment

A terminal device requests an AP that operates in a secure card and can be saved to be downloaded (refer it to as "DL", hereinafter). At this time, when there is a space in an inner nonvolatile memory 41, an IC command processing part 13 performs a process for storing the program code (program data describing a program) of the AP sent from the terminal device in the inner nonvolatile memory 41, that is, a DL process. In accordance with an installing request of the terminal device, the IC command processing part 13 executes the program code of the downloaded AP to prepare data for the AP and perform a process capable of executing the AP, that is, an installing process).

When there is no space in the inner nonvolatile memory 41, the IC command processing part 13 performs a is process for saving the program code and data of the AP already stored in the inner nonvolatile memory 41 and capable of being saved in the secure area 51 in accordance with an instruction from the terminal device (or a decision of itself). Then, the IC command processing part 13 performs the DL process and the installing process of the AP supplied from the terminal device in the inner nonvolatile memory 41 having a space formed.

Further, the terminal device requests the AP saved in the secure area 51 to be initiated. At this time, when a space area exists in the inner nonvolatile memory 41, the IC command processing part 13 restores (moves data) the program code and data of the AP whose start is requested to the inner nonvolatile memory 41 to return the AP to its installed state and initiate the AP.

In this case, when the space area does not exist in the inner nonvolatile memory 41, the program code and the data of the AP capable of being saved and stored in the inner nonvolatile memory 41 are saved in the secure area 51. The program code and the data of the AP whose start is requested are restored in the inner nonvolatile memory 41 in which a space is formed.

Only the data prepared by the installing process of the AP may be saved in the secure area 51. The program code of the AP may be deleted from the inner nonvolatile memory 41, because the program code itself is different from the data to be saved, is not formed in the secure card and the same program code can be downloaded from the terminal device at any time. The AP is activated by restoring the data of the AP saved in the secure area 51 in the space area of the inner nonvolatile memory 41 and downloading the program code of the AP in the inner nonvolatile memory 41 from the terminal device.

FIG. 1 shows the structure of the inner nonvolatile memory 41. In the inner part of the inner nonvolatile memory 41, below-described areas are provided. They include an AP storing area 411 in which the program codes of the AP are stored, a data storing area 412 in which data used in the AP is stored, an AP managing table 413 for managing the AP having the program code and the data stored in the inner nonvolatile memory 41, a saved AP managing table 414 for managing the AP saved in the secure area 51 and a key managing area 415 in which a key used for encoding and decoding the code or the data to be saved and restored and a key used for forming and verifying a signature are stored.

In the AP managing table 413, as shown in FIG. 4, AP identifiers for completely showing what the AP is are described. Install flags for showing whether or not the installing process of the AP is performed are described. Code addresses for showing the addresses of the AP storing areas 411 in which the program codes are stored are described. Data addresses for showing the addresses of the data storing areas 412 in which the data is stored are described. Save affirmative or negative showing whether or not the AP can be saved is described. The save affirmative or negative is transmitted from the terminal device upon downloading the AP.

Further, in the saved AP managing table 414, as shown in FIG. 5, AP identifiers, saved data identifiers for completely specifying the stored positions of saved data or the like and signature data for the saved data are described. The saved data identifiers can be set in various forms. For instance, (address of a position in which data is saved+data size) may be set as a save data identifier.

Further, FIG. 6 shows the structure of the secure area 51 having a data saving area 511 for storing the saved data.

Now, the transition of the AP managing table 413 or the saved AP managing table 414 upon downloading, installing, saving and restoring the AP will be described.

FIG. 13A shows the AP managing table 413 in an initial state (any of the APs is not downloaded/installed/saved/restored). Further, FIG. 16A shows the saved AP managing table 414 in an initial state. When the affirmative AP1 of the save affirmative or negative is downloaded from the terminal device as the AP, the AP managing table 413 is described as shown in FIG. 13B. "code 1" designates the address of the program code of the AP1 stored in the AP storing area 411. Further, when the affirmative AP2 of the save affirmative or negative is downloaded, the AP managing table 413 is described as shown in FIG. 13C. While the AP1 and the AP2 are installed, the description of the AP managing table 413 changes as shown in FIG. 14A. The address of the data of the AP1 stored in the data storing area 412 is described as "data1". The address of the data of the AP2 stored in the data storing area 412 is described as "data2".

Further, FIG. 14B shows a state that the negative AP3 of the save affirmative or negative and the affirmative AP4 and AP5 of the save affirmative or negative are downloaded from the terminal device and installed. Further, the states of the AP storing area 411 and the data storing area 412 of the inner nonvolatile memory 41 at this time are shown in FIG. 17A. The state of the data saving area 511 of the secure area 51 is shown in FIG. 17B. There is no space in the AP storing area 411.

Then, when the terminal device requests a certain AP (here, AP6) to be downloaded under the state that there is no space in the AP storing area 411 as described above, a process shown in FIG. 7 is carried out between the terminal device and the IC command processing part 13.

When the terminal device requests the AP6 to be downloaded (1), the IC command processing part 13 informs the terminal device of an error that there is no space area, because a space does not exists in the AP storing area 411 of the inner nonvolatile memory 41 (2). The terminal device requests the list of APs capable of being saved (3) to obtain the list of APs capable of being saved from a card (4). The terminal device selects an AP (here, AP2) capable of being saved from the list and requests the AP2 to be saved (5). The IC command processing part 13 performs a saving process of the AP2 (6) to inform the terminal device of the completion of the saving process (7) The AP managing table 413 under a state that the saving process of the AP2 is carried out is shown in FIG. 15A. The saved AP managing table 414 is shown in FIG. 16B. Further, the states of the AP storing area 411 and the data storing area 412 of the inner nonvolatile memory 41 are shown in FIG. 11A. The state of the data saving area 511 of the secure area 51 is shown in FIG. 18B.

The terminal device requests the AP6 to be downloaded (8). The IC command processing part 13 performs a downloading process of the AP6 (9) to inform the terminal device of the completion of the downloading process (10). The AP managing table 413 under a state that the downloading process of the AP6 is carried out is shown in FIG. 15B (address code 6 may be the same as or different from code 2 or data2 in the space area obtained by the saving process of the AP2). Further, the states of the AP storing area 411 and the data storing area 412 of the inner nonvolatile memory 41 are shown in FIG. 20(*a*).

Figure 8:
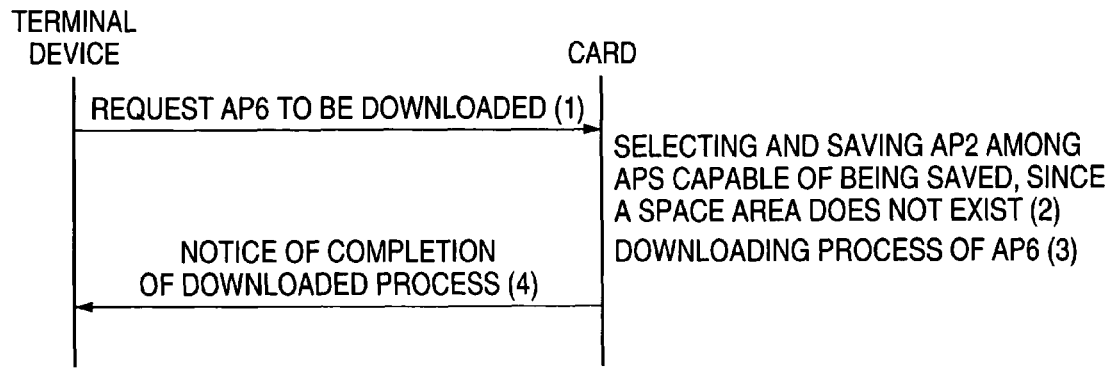
FIG. 8 is a view showing the save sequence of the secure card in the first embodiment of the present invention (when a card itself decides to save AP)

In the specification, an example that the IC command processing part 13 waits for the request for saving the AP from the terminal device to perform the saving process is described. However, when there is no space in the AP storing area 411, the IC command processing part 13 may decide by itself to perform the saving process of the AP. In this case, as shown in FIG. 8, a following procedure is performed as described below. When the terminal device requests the AP6 to be downloaded (1), the IC command processing part 13 saves the AP2 selected from among the APs capable of being saved (2) to ensure a space area in the AP storing area 411. Then, the IC command processing part 13 performs the downloading process of the AP6 (3) to inform the terminal device of the completion of the downloading process (4).

As described above, the AP2 can be automatically saved without a consciousness of the terminal device. Further, in this case, after the AP6 is completely downloaded, the terminal device may be informed of the automatic save of the AP2.

Figure 7:
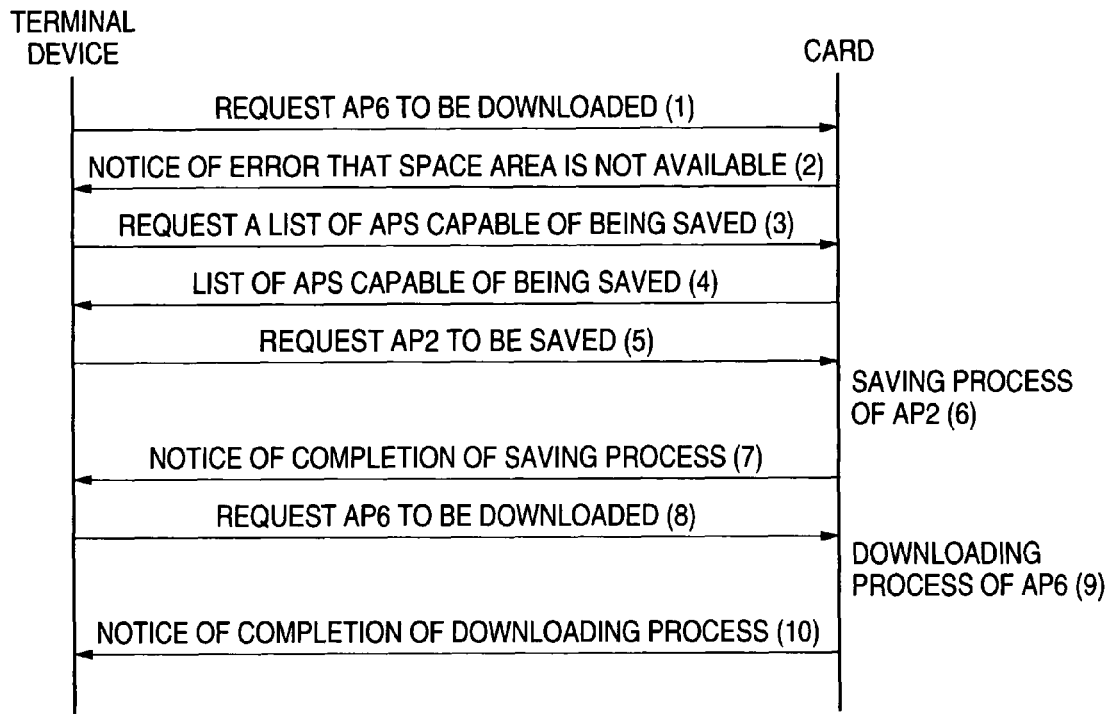
FIG. 7 is a view showing the save sequence of the secure card in the first embodiment of the present invention (when a terminal device triggers to save AP)
Figure 9A:
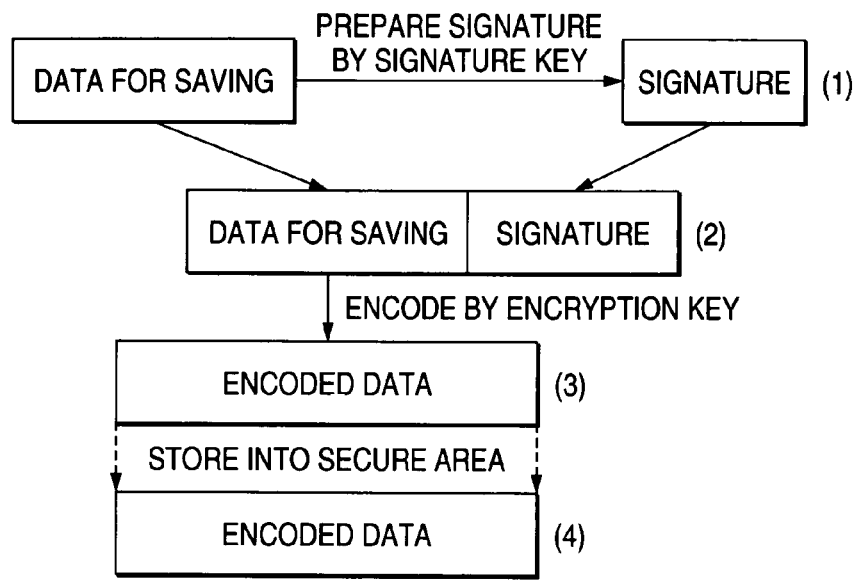
FIGS. 9A and 9B are views showing a procedure for preparing saved data of the secure card in the first embodiment of the present invention.
Figure 9B:
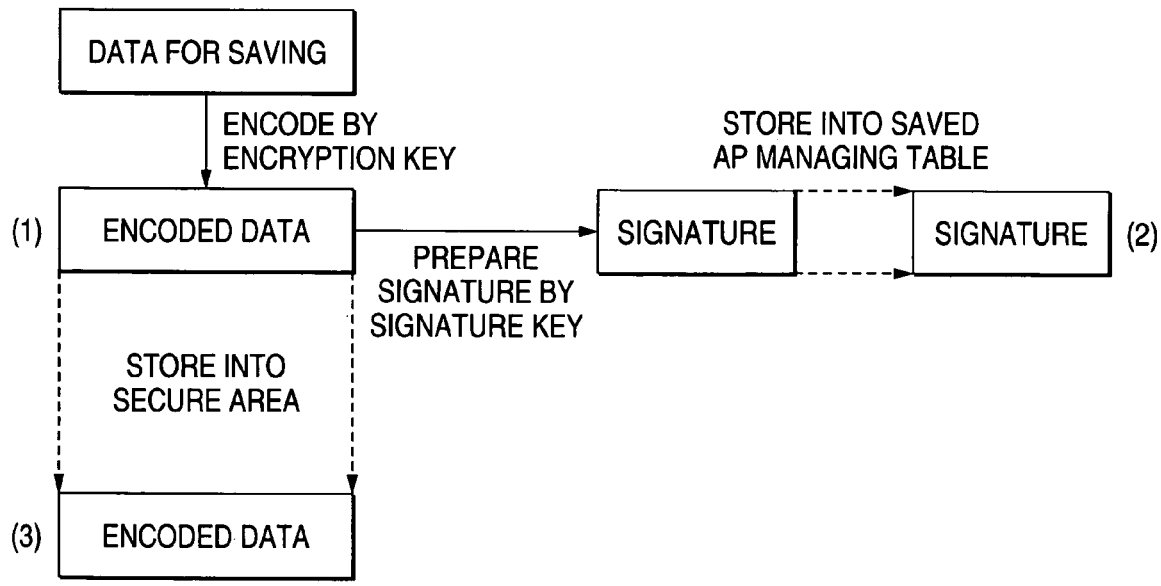

Further, the AP saving process in (6) of FIG. 7 or (2) of FIG. 8 is performed in accordance with a procedure shown in FIG. 9A or in FIG. 9B. FIG. 9A shows a system for storing signature data in the secure area 51. Firstly, a signature key is used to prepare the signature data of saving data (as described above, there are a case that the program code and the prepared data of the installed AP are employed as the saving data and a case that only the prepared data is used as the saving data) (1). The saving data is connected to the signature data (2). The connected data is encoded by a saving encryption key (3). The encoded data is stored in the data saving area 511 of the secure area 51 (4). Then, the AP identifiers and the saved data identifiers are added to the saved AP managing table 414 (in the case of this system, the signature data is not added to the saved AP managing table 414). When only the data prepared in the installing process is employed as the saving data, the program code of the AP to be saved is deleted from the AP storing area 411 and information related to the AP to be saved is deleted from the AP managing table 413.

FIG. 9B shows a system for storing the signature data in the saved AP managing table 414. The saving data is encoded by the encryption key (1). The signature data of the encoded data is prepared by using the signature key and the signature data is stored in the saved AP managing table 414 (2). The encoded data is stored in the data saving area 511 of the secure area 51 (3). Then, the AP identifiers and the saved data identifiers are added to the is saved AP managing table 414. When only the data prepared by the installing process is employed as the saving data, the program code of the AP to be saved is deleted from the AP storing area 411 and information related to the AP to be saved is deleted from the AP managing table 413.

Now, the operation of the secure card 10 when the terminal device requests the AP2 in a saved state to be started will be described. In this case, there are a method in which the terminal device recognizes that the AP2 is saved and requests the AP2 to be restored and a method in which the IC command processing part 13 recognizes that the AP2 requested to be started is saved and the IC command processing part 13 itself performs a restoring process of the AP2.

Figure 10:
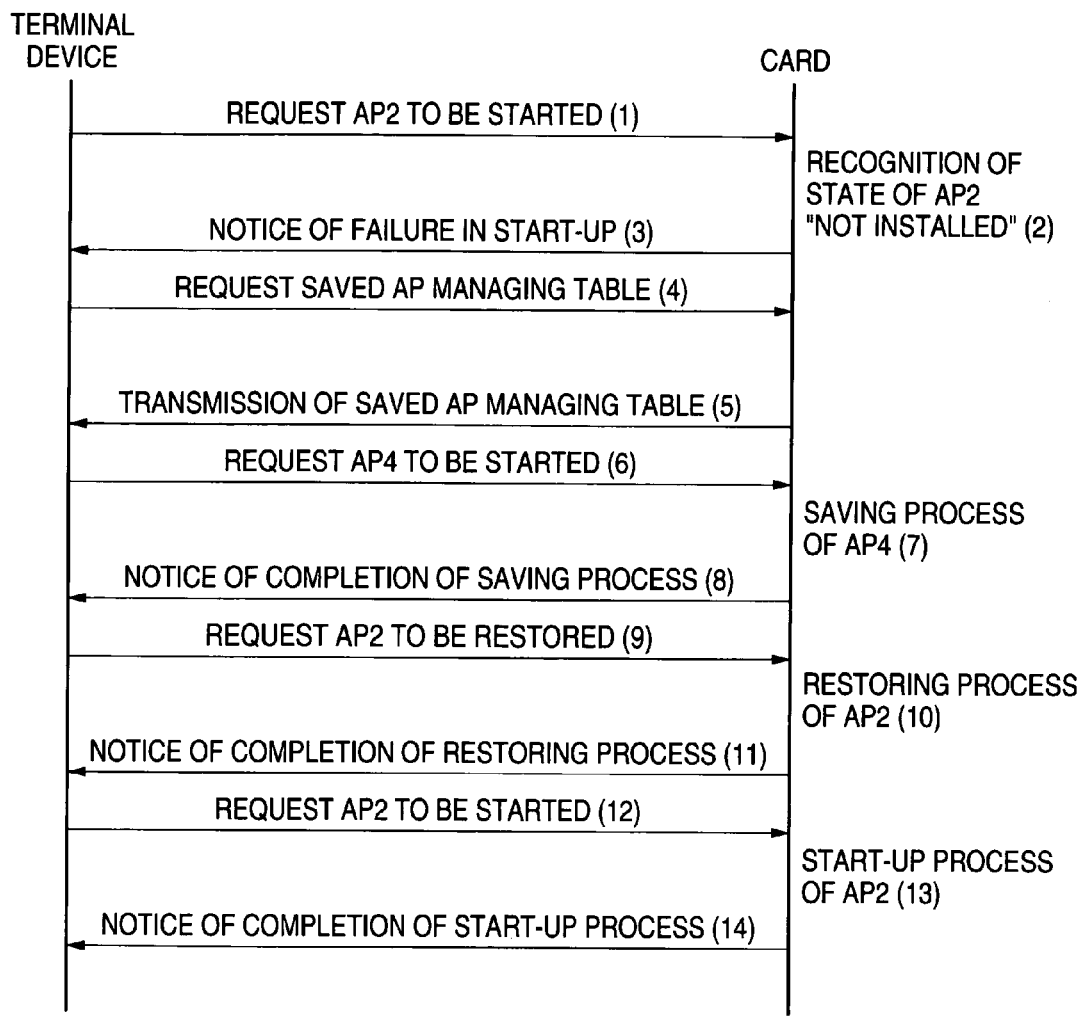
FIG. 10 is a view showing a restoring sequence of the secure card in the first embodiment of the present invention (when the terminal device triggers to restore AP)

FIG. 10 shows a procedure when the terminal device requests the AP2 to be restored. The terminal device requests the secure card 10 to start the AP2 (1). The IC command processing part 13 refers to the AP managing table 413 to recognize that the AP2 does not exist in the inner nonvolatile memory 41 (2) and informs the terminal device that the AP2 does not exist in the inner nonvolatile memory 41 (3). The terminal device requests the secure card 10 to obtain the "saved AP managing table" 414 (4). The IC command processing part 13 transmits the saved AP managing table 414 to the terminal device (5). The terminal device recognizes that the AP2 is saved in accordance with the saved AP managing table 414 and requests the secure card 10 to save an arbitrary AP (here, AP4) to be saved (6). The IC command processing part 13 performs a saving process of the AP4 (7) and informs the terminal device of the completion of the saving process (8).

Figure 19A:
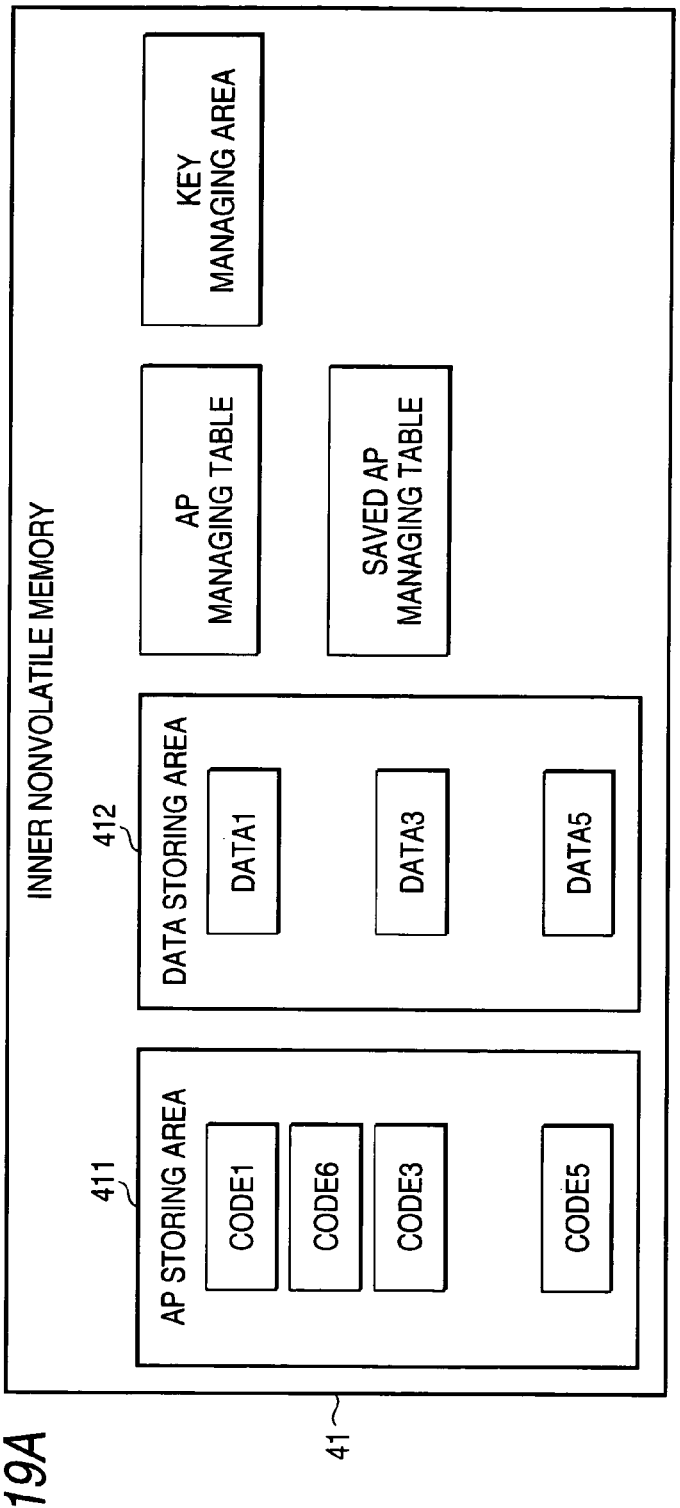
FIGS. 19A and 19B are views showing the transitions of the inner nonvolatile memory and the secure area of the secure card in the first embodiment of the present invention.
Figure 19B:
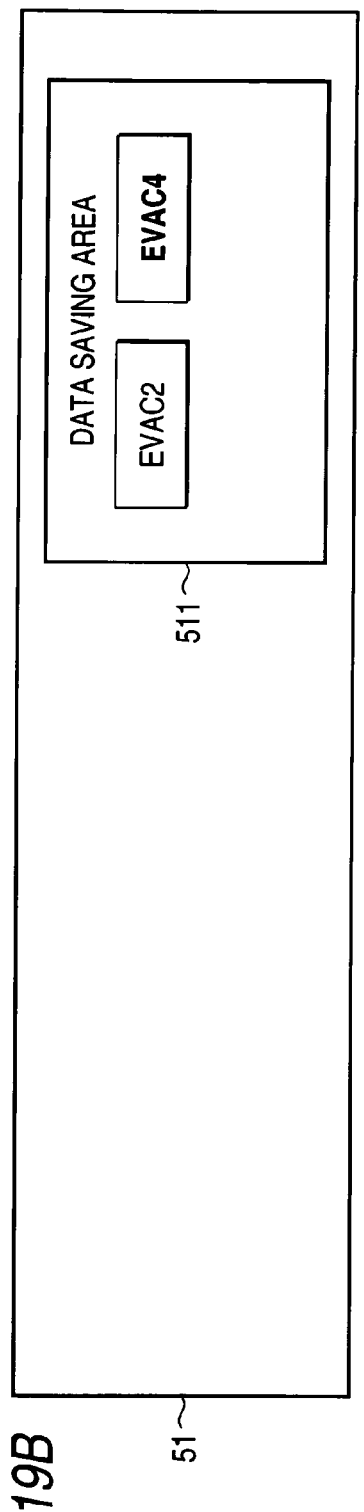
Figure 20A:
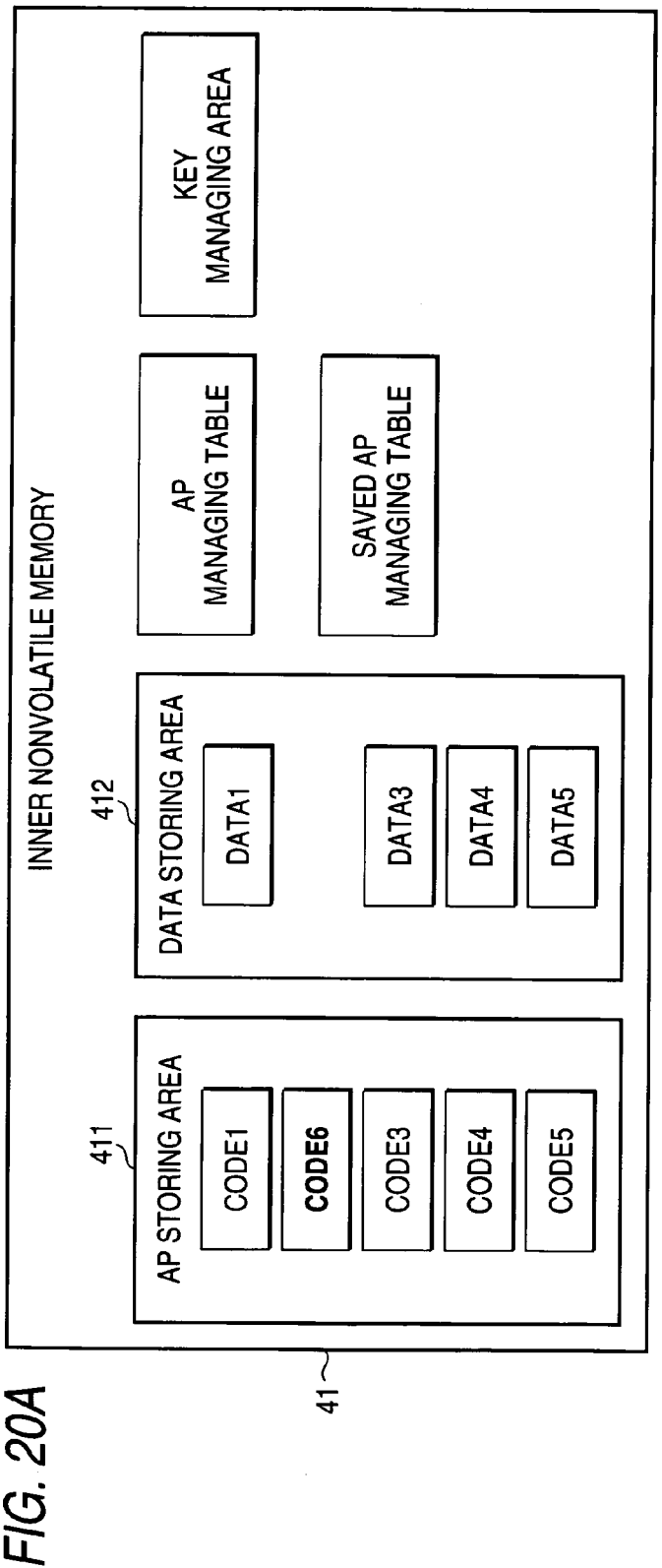
FIGS. 20A and 20B are views showing the transitions of the inner nonvolatile memory and the secure area of the secure card in the first embodiment of the present invention.
Figure 20B:
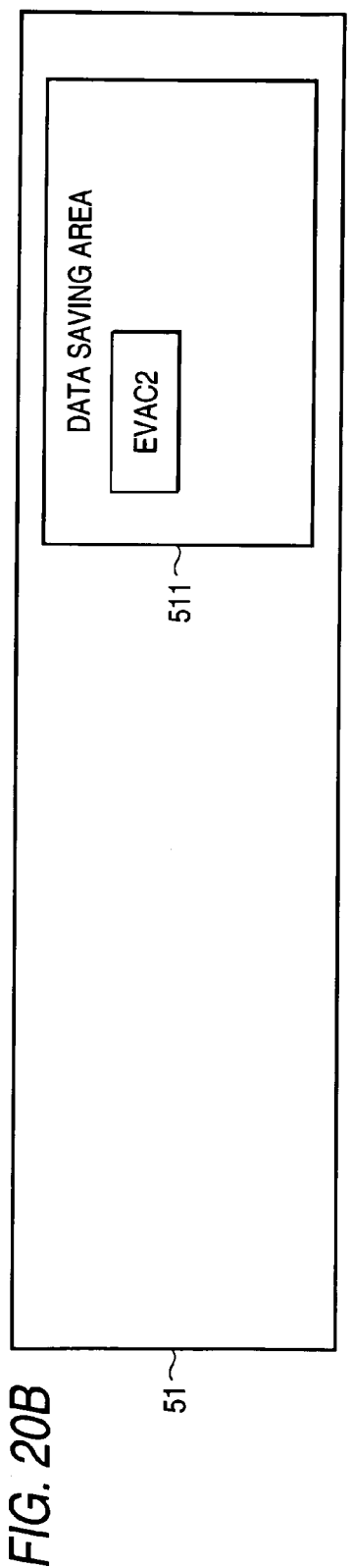

FIGS. 19A and 19B show the states of the AP storing area 411, the data storing area 412 and the data saving area 511 when the AP4 is saved from a state shown in FIGS. 20A and 20B. Further, FIG. 16C shows the saved AP managing table 414 at this time.

Then, the terminal device requests the secure card 10 to restore the AP2 (9). The IC command processing part 13 performs a restoring process of the AP2(10) and informs the terminal device of the completion of the restoring process (11). FIG. 15C shows the AP managing table 413 under a state that the AP2 is restored (address code 7 and data 7 may be the same or not the same as code 4 or data 4 in a space area obtained by saving the AP4). FIG. 16D shows the saved AP managing table 414 at this time. FIGS. 21A and 21B show the states of the AP storing area 411, the data storing area 412 and the data saving area 511 at this time.

Then, the terminal device requests again the secure card 10 to start the AP2 (12). The IC command processing part 13 starts the AP2 (13) and informs the terminal device of the completion of the starting process (14).

In the information of (3), the terminal device is informed that the AP2 is saved at the same time, so that processes of (4) and (5) can be omitted. Further, when the terminal device recognizes that the AP2 is saved, the procedure after (4) is carried out. In the saving process of the AP2, only the data prepared by an installing process is saved and the program code of the AP2 is deleted, the terminal device downloads the program code of the AP2 in accordance with the procedure of (9).

Figure 11:
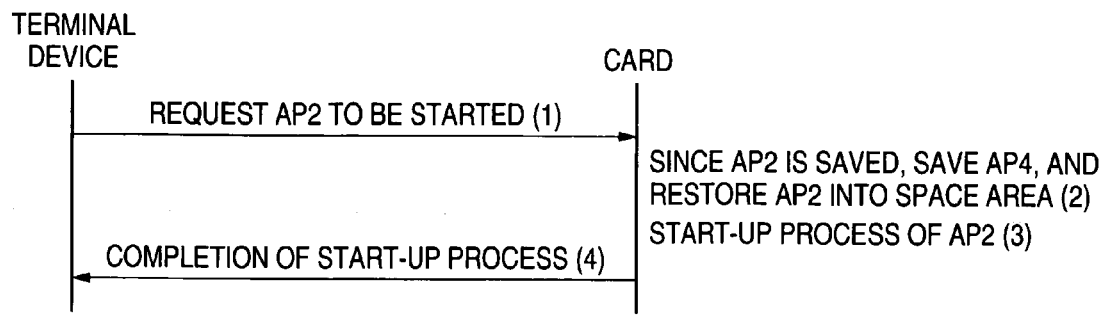
FIG. 11 is a view showing the restoring sequence of the secure card in the first embodiment of the present invention (when the card itself automatically restores AP)

On the other hand, FIG. 11 shows a procedure when the IC command processing part 13 recognizes that the AP2 requested to be started is saved and the IC command processing part 13 itself restores the AP2. The terminal device requests the secure card 10 to start the AP2 (1). The IC command processing part 13 refers to the AP managing table 413 to recognize that the AP2 does not exist in the inner nonvolatile memory 41. Then, the IC command processing part 13 refers to the saved AP managing table 414 to recognize that the AP2 is saved, select a certain AP as an object to be saved (here, AP4) and save the AP. Then, the IC command processing part 13 restores the AP2 in a space area (2) to start the AP2 (3) and informs the terminal device of the completion of the start of the AP2 (4).

In this case, even when the terminal which does not notice that the AP2 is saved outputs an instruction for starting the AP2, the IC command processing part 13 performs a process for starting the AP2. Accordingly, the terminal device does not need to know whether or not the AP requested to start is saved.

This method is applied to a case that the AP2 is saved only for the data prepared by an installing process. This method cannot be applied to a case that the program code of the AP2 is deleted.

Figure 12A:
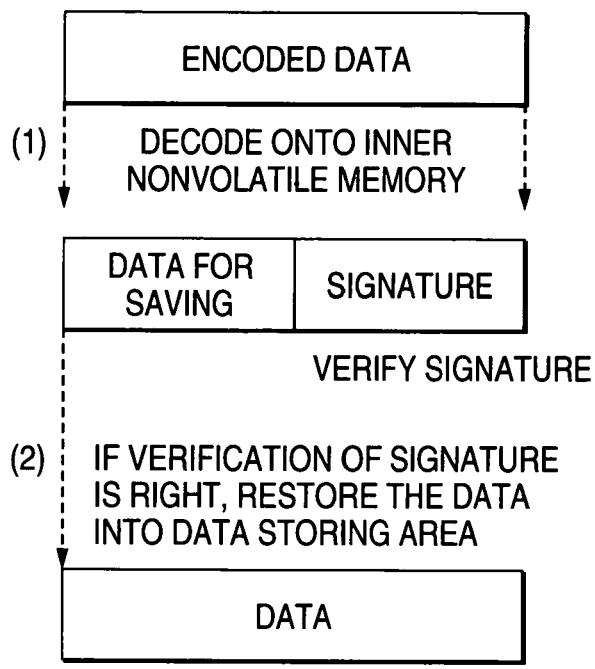
FIGS. 12A and 12B are views showing a procedure for preparing the restored data of the secure card in the first embodiment of the present invention.
Figure 12B:
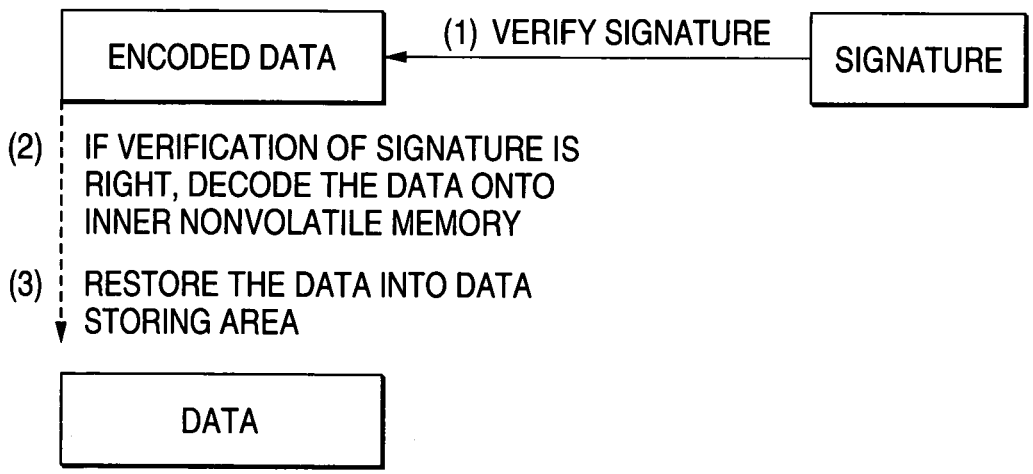

The restoring process in (10) of FIG. 10 or (2) of FIG. 11 is carried out in accordance with a procedure shown in FIG. 12A when the saving process is performed by the procedure shown in FIG. 9A. When the saving process is carried out by the procedure shown in FIG. 9B, the restoring process is performed in accordance with a procedure shown in FIG. 12B. In FIG. 12A, saved data (encoded data) is recognized by the AP identifier of the saved AP managing table 414 to decode the encoded data on the inner nonvolatile memory 41 by a decoding key (1). Then, a saved data main body and signature data are recognized from the decoded data to verify the propriety of the signature data by using the verification key. When the signature is justifiable, a program code included in the saved data main body is restored in the AP storing area 411 of the inner nonvolatile memory 41 and data is restored in the data storing area 412 (2). Further, the AP identifier is described in the AP managing table 413 to set an install flag to ON. The addresses of restored data stored in the AP storing area 411 and the data storing area 412 are respectively described as a code address and a data address. Finally, the saved and encoded data in the secure area 51 and parts related to the AP in question in the saved AP managing table 414 are deleted.

In the procedure shown in FIG. 12A, the saved data (encoded data) is recognized by the AP identifier in the saved AP managing table 414 and verified on the basis of the signature data described in the saved AP managing table 414 by using the verification key (1). When the verified result is proper, the encoded data is decoded on the inner nonvolatile memory 41 by using the decoding key (2). The program code is restored in the AP storing area 411 of the inner nonvolatile memory 41 and the data is restored in the data storing area 412 (3). Subsequent processes are the same as those shown in FIG. 12A.

Further, the AP is saved only for the data prepared by the installing process. In this case, when the terminal device downloads the program code of the AP, the restoring process of the data is carried out in accordance with a following procedure.

The AP to be restored is downloaded from the terminal device. The IC command processing part 13 describes an AP identifier and a code address in the AP managing table 413 and searches for the same AP identifier as that of the downloaded AP from the saved AP managing table 414. When a corresponding AP identifier is present, encoded data is read out from the data saving area 511 of the secure area 51 and decoded. The saved data main body and the signature data are recognized from the decoded data to verify the propriety of the signature data. When the verified result is proper, the saved data main body is stored in the data storing area 412 of the inner nonvolatile memory and the install flag of the corresponding AP in the AP managing table is set to ON. As a data address, the address of the data storing area 412 in which the restored data is stored is set. Finally, the saved encoded data in the secure area and parts related to the AP in question in the saved AP managing table are deleted.

Here, the case that both the program code of the AP and the data prepared by the installing process are saved and the case that only the data is saved and the program code is deleted are described above. However, when a quantity of data is extremely larger than that of the program code, only the data may be saved in the secure area 51 and the program code may be left in the AP storing area 411 of the inner nonvolatile memory 41. When the above described system is used, the states of the AP storing area 411, the data storing area 412 and the data saving area 511 shown in FIGS. 18A and 18B change to those as shown in FIGS. 22A and 22B. Further, the states shown in FIGS. 20A and 20B change to those as shown in FIGS. 23A and 23B.

When both the program code and the data of the AP are saved, and when the data is saved and the program code is left in the inner nonvolatile memory, an automatic restoring procedure by the IC command processing part shown in FIG. 11 can be realized.

Further, when the terminal device requests the AP saved in the secure area 51 to be started, the AP may be executed in accordance with a procedure described below while the program code or the data of the AP are left in the secure area 51.

For instance, under the states shown in FIGS. 18A and 18B, FIG. 15A, and FIG. 16B, when the terminal device requests the secure card 10 to execute the AP2, the IC command processing part 13 recognizes that the AP2 is not installed from the AP managing table (FIG. 15A) and the AP2 is saved from the saved AP managing table (FIG. 16B) The IC command processing part 13 reads evac 2 on the basis of a saved data identifier to perform a decoding process and a signature verification. When the signature verification is normally completed, the IC command processing part obtains the program code of the AP2 from the decoded data to execute the AP2.

In this case, the saved AP does not need to be restored in the inner nonvolatile memory 41.

As described above, in the secure memory according to the first embodiment, only the APs capable of being saved are saved among the APs downloaded and installed in the inner nonvolatile memory. Therefore, the AP that requires the highest secrecy is set to a "save negative". Thus, the AP can avoid being an object to be saved. Further, the AP that requires such a security as to put up with a risk of loss is set to a "save affirmative". Consequently, a secret area in the secure memory can be efficiently used.

Second Embodiment

The structure of a secure memory in a second embodiment of the present invention is the same as that of the first embodiment (FIGS. 2 and 3).

In the first embodiment, the case that the AP is downloaded in the inner nonvolatile memory 41 of the secure memory 10, and when there is no space for downloading a new AP in the inner nonvolatile memory 41, the installed AP capable of being saved is saved to the secure area 51 from the inner nonvolatile memory 41 is described. However, in the second embodiment, a secure area 51 may be used as a destination in which an AP is downloaded. In this case, the installing process of the AP downloaded in the secure area 51 is carried out in an inner nonvolatile memory 41.

It is determined whether the destination in which the AP is downloaded is set to the inner nonvolatile memory 41 or to the secure area 51 in accordance with systems described below.

According to the first system, upon downloading the AP, a flag exclusively used for downloading the AP in the inner nonvolatile memory is transmitted as well as the program code of the AP from a terminal device. The IC command processing part 13 of the secure memory 10 refers to the flag. When the inner nonvolatile memory is designated to download the AP, the IC command processing part 13 necessarily downloads the AP in the inner nonvolatile memory 41. When the inner nonvolatile memory is not designated to download the AP, if there is a space in the inner nonvolatile memory 41, the IC command processing part 13 downloads the AP in the inner nonvolatile memory 41. When there is no space in the inner nonvolatile memory 41, the IC command processing part 13 downloads the AP in the secure area 51.

Further, according to the second system, only when the terminal device permits the AP to be downloaded in the secure area 51, upon downloading the AP, a flag for permitting the AP to be downloaded in the secure area is transmitted as well as the program code of the AP. When the flag for permitting the AP to be downloaded in the secure area is added, if there is a space in the inner nonvolatile memory 41, the IC command processing part 13 of the secure memory 10 downloads the AP in the inner nonvolatile memory 41. When there is no space in the inner nonvolatile memory 41, the IC command processing part 13 downloads the AP in the secure area 51. When the flag for permitting the AP to be downloaded in the secure area is not added, the IC command processing part necessarily downloads the AP in the inner nonvolatile memory 41.

Figure 24:
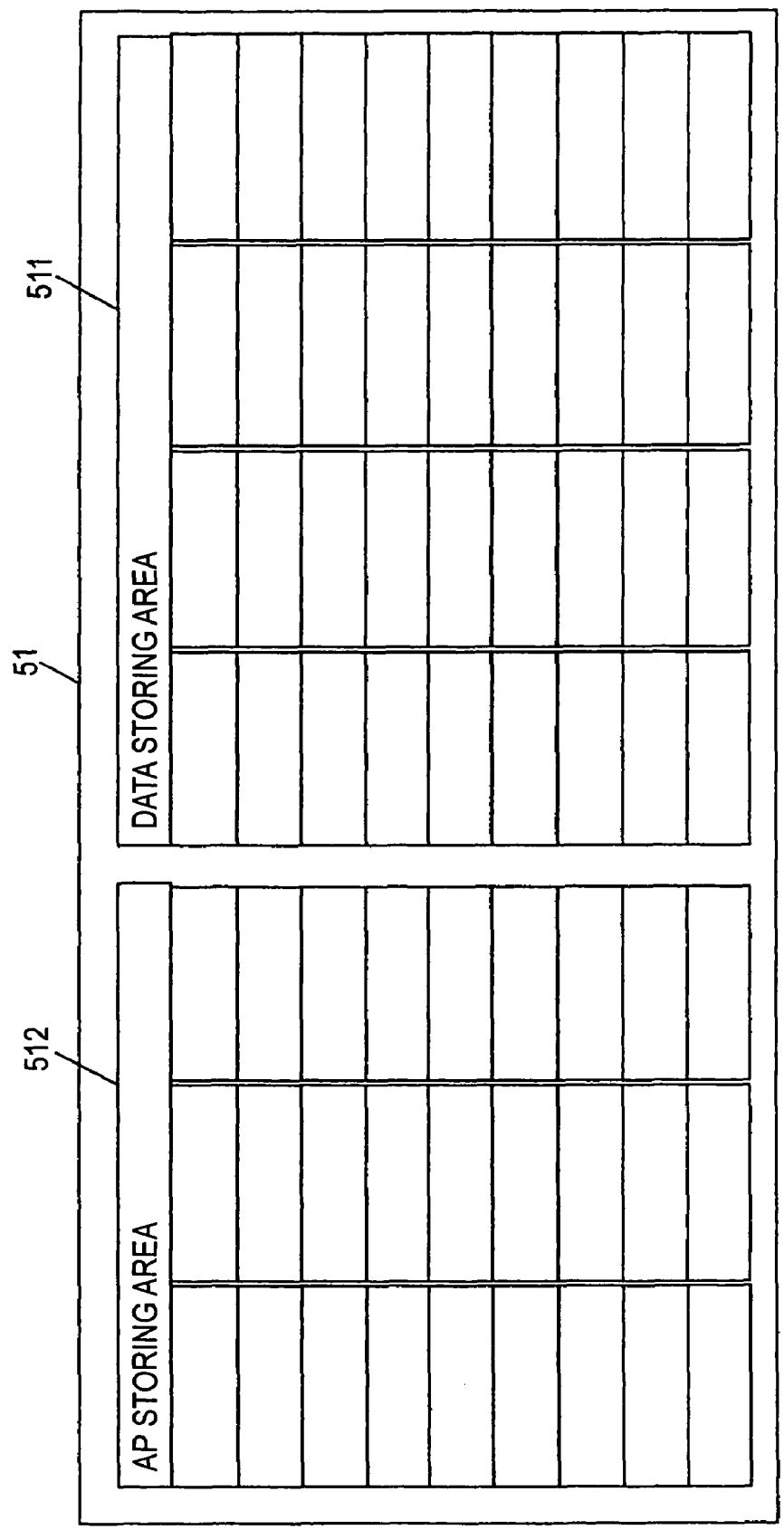
FIG. 24 is a view showing the structure of the secure area of a secure card according to a second embodiment of the present invention.

In the secure area 51 of the secure memory 10, as shown in FIG. 24, an AP storing area 512 for storing the program codes of the downloaded APs is provided as well as a data saving area 511.

Further, the inner nonvolatile memory 41 has the same structure as that shown in FIG. 1. In this case, as shown in FIG. 25, an AP managing table comprises an AP managing table 413 for managing APs downloaded or installed in the inner nonvolatile memory 41 and a secure area downloaded AP managing table 416 for managing the APs downloaded in the secure area 51. In the secure area downloaded AP managing table 416, items necessary for installing the APs on the inner nonvolatile memory 41, that is, "storing addresses" indicating positions on the secure area 51 in which the APs are stored, "signature data" for recognizing whether or not the APs are altered, and "save affirmative or negative flags" indicating whether or not the APs can be saved after the APs are installed are described as well as AP identifiers.

The items of the AP managing table 413 are the same as those of the first embodiment (FIG. 4) "Install flags" indicating whether or not the APs stored on the inner nonvolatile memory 41 are in installed states, "save affirmative or negative flags" indicating whether or not the APs can be saved, "data addresses" indicating the positions of data when the APs are installed and "code addresses" indicating places from which program codes are read out are described as well as AP identifiers.

The specific numbers of the AP managing table 413, for instance, #4 and #5 are ensured for installing the APs (secure area downloaded APs) downloaded in the secure area 51. Accordingly, these numbers cannot be used to download the APs in the inner nonvolatile memory 41. Therefore, the downloading and installing processes of the APs to be downloaded in the inner nonvolatile memory 41 are carried out by using #1 to #3 of the AP managing table 413 in the same manner as that of the first embodiment.

On the other hand, the IC command processing part 13 performs an installing process of the AP downloaded in the secure area 51 in accordance with a following procedure.

In accordance with the storing address of the secure area downloaded AP managing table 416, the IC command processing part 13 reads out the program code of the AP from the AP storing area 512 of the secure area 51 to decode the program code and verify a signature. When the verified result is proper, the IC command processing part 13 stores the decoded program code in the AP storing area 411 of the inner nonvolatile memory 41. Further, the IC command processing part 13 sets the AP identifier, the code address and the save affirmative or negative flag (the same as that described in the secure area downloaded AP managing table 416) to the specific number for the secure area downloaded AP of the AP managing table 413.

At this time, when there is no space in the specific numbers for the secure area downloaded APs, the IC command processing part 13 saves the installed AP that uses the specific number in the data saving area 511 of the secure area 51 to form a space.

Then, the IC command processing part 13 performs an installing process to store prepared data in a data storing area 412, describe a data address in the AP managing table 413 and set an install flag to ON.

Even after the installing process, the program code of the AP downloaded in the secure area 51 is kept remaining in the AP storing area 512 of the secure area 51 as it is. The description of the secure area downloaded AP managing table 416 is left. Accordingly, even when the program code is deleted upon saving the installed AP, the AP does not need to be downloaded again from a terminal device.

An AP designated to be downloaded in the inner nonvolatile memory (AP downloaded exclusively in the inner nonvolatile memory) is not preferably saved in the secure area On the other hand, an AP (AP capable of being downloaded in the secure area) which can be downloaded in the secure area may be possibly saved without problem. In this secure card, the AP downloaded in the secure area and the AP downloaded in the inner nonvolatile memory are separately managed. Accordingly, an area in which the AP downloaded exclusively in the inner nonvolatile memory is stored is not occupied by the APs that can be downloaded in the secure area. On the other hand, since an exclusive area is ensured for the AP that can be downloaded in the secure area, another AP that can be downloaded in the secure area can be installed by saving the already installed AP that can be downloaded in the secure area.

The AP managing table 413 may be divided in such a manner that for instance, to #1 to #3, APS downloaded exclusively in the inner nonvolatile memory are assigned, and to #4 to #5, APs which may be downloaded in both of them are assigned.

Further, only APs downloaded in the secure area may be saved and APs downloaded in the inner nonvolatile memory may not be saved. In this case, the save affirmative or negative flags of the secure area downloaded AP managing table may not be provided.

Further, install flags and data storing addresses are added to the secure area downloaded AP managing table so that APs can be installed in the secure area (a data storing area is formed).

As the APs, which are described here, designated to be downloaded in the inner nonvolatile memory, APs having high security, for instance, electronic money AP may be applied thereto. The program codes and data of such APs requiring a security intensity which are directly associated with money are undesirably outputted outside the inner nonvolatile memory. Therefore, these APs may be recommended to be set to a save negative.

Further, as an IC card (including an IC part of a secure memory card) is generally extensively employed, an arbitrary player may be expected to install an AP in the card without performing a strict procedure. Thus, an AP or the like for managing an ID and a password necessary when the player accesses any server (or when the player uses any terminal application) may be considered to be an AP that can be downloaded in the secure area. When the server is used by an enterpriser or an individual (especially, in the case of the server used by the individual), an extremely high security level is not required. If a user should lose (break) the ID and the password, the ID and the password could be easily reissued.

It is undesirable for such an AP to constantly use the inner nonvolatile memory having a small capacity like the electronic money AP in view of cost. An more appropriate using method is that the AP is downloaded in the secure area having a larger capacity and it is saved when the AP likewise downloaded in the secure area is employed.

However, such a classification is not necessarily logically derived, and variously set depending on the degree of request for security desired by an AP provider and the propriety of use of the inner nonvolatile memory decided by a card issuer.

In any case, in the secure card according to the second embodiment, since the AP can be downloaded in the secure area, more patterns can be selected in the downloading process and the installing process of the AP than those in the first embodiment. Accordingly, various security request levels of the AP can be satisfied and the private area of the secure memory can be more efficiently employed.

Further, when the AP can be downloaded in the secure area and installed in the secure area, the patterns in the downloading process and the installing process of the AP are more increased. The secret area of the secure memory can be more efficiently employed. For instance, an AP of the highest security which is downloaded in the inner nonvolatile memory and installed in the inner nonvolatile memory and an AP of a higher security which is downloaded in the secure area and installed in the inner nonvolatile memory may be set to a save negative. An AP installed in the secure area may be set to a save affirmative.

Third Embodiment

In a third embodiment of the present invention, the use of data under a state that the data shared between APs is saved will be described below.

An AP (here, AP1) having a construction in which the data can be shared between the APs and which is permitted by an AP2 can refer to the data of the AP2. The AP (AP1) to be permitted can refer to only specific data (a part of data) of data managed by the AP (AP2) of a permitting side. A plurality of permissions of reference to a part of data from other APs can be set.

FIG. 26A shows an example of a permission designating table describing the relation between data to which a certain AP gives a permission of reference and an AP to be permitted. In this case, as shown in FIG. 26B, the permission of reference to data-a is set to the AP1. Further, as shown in FIGS. 18, 15A and 16B, the AP1 is in an installed state and the AP2 is in a saved state.

An IC command processing part 13 saves the data including the data data-a to be permitted in the saving process of the AP2. Upon execution of the AP1, when the reference to the data data-a held by the AP2 is generated, the IC command processing part 13 recognizes that the AP2 is not installed from an AP managing table (FIG. 15A) and the AP2 is saved from a saved AP managing table (FIG. 16B). The IC command processing part 13 reads the encoded data evac2 of the saved AP2 to decode the encoded data and verify a signature. When the verification is normally completed, the IC command processing part 13 refers to the data-a from the decoded data of the AP2.

When a writing is generated in the data-a, the IC command processing part 13 performs an encoding process and a preparation of signature to all the data of the AP2 as well as the updated data-a. The IC command processing part 13 stores the encoded data in a secure area, updates evac 2 showing a position in which the encoded data is stored and updates signature data sign 2 to the prepared signature data.

Further, other APs can use the program code of the saved AP as well as the data. FIGS. 27A and 27B show an example of a permission designating table describing the relation between a program code to which a certain AP gives a permission of execution and an AP to be permitted. The AP1 can execute code-a of the saved AP2 in the same procedure as that of the above-described data.

As described in the first embodiment, to save the AP, there are three patterns that (1) only data is saved and a program is deleted, (2) both data and a program are saved and (3) only data is saved and a program is left in an inner nonvolatile memory. In the case of the AP used to access the server which is described in the second embodiment as an AP capable of being downloaded in the secure area, the AP is connected to a network upon using it, so that the program code can be downloaded. Thus, the pattern of (1) is suitable for the AP (However, the application of the pattern of (2) or (3) is not necessarily denied).

Further, in the case of the AP for managing an ID and a password necessary upon using a terminal AP, since the AP is not constantly connected to the network, the pattern of (2) is suitable for the AP (the application of the pattern (3) is not denied). The pattern of (3) may be applied to a case that an AP provider does not desire to save a program code.

In the embodiment of the present invention, an example that the three areas including the non-authorized area, the authorized area and the secure area 3 are provided as memory areas in the large capacity nonvolatile memory 50 is described. However, the large capacity nonvolatile memory 50 needs to have the secure area in the present invention and other areas do not matter.

As apparent from the above description, the secure card of the present invention efficiently utilizes an area having secrecy so that data necessary for using many APs can be safely held therein. Therefore, any terminal device satisfying authorizing conditions can use the data held in the secure card.

What is claimed is:

1. A memory device comprising:
a first tamper resistant memory which cannot be accessed directly by an external electronic device;
a second non-tamper resistant memory which cannot be directly accessed by the external electronic device;
a data processing section that moves data in the first tamper resistant memory or the second non-tamper resistant memory; and
a managing table in which managing information for the data stored in the first memory is described, the managing information including information indicating whether or not the data can be moved to the second memory,
wherein when requested via the data processing section by the external electronic device to download or install first data in the first memory and if there is no space area for downloading or installing the first data in the first memory, said data processing section moves to the second memory second data which is accumulated in the first memory in order to create space area in the first memory sufficient to perform the downloading or installing the first data upon reception of an instruction from the electronic device, and when there is space area available in the first memory, said processing section restores the moved second data in the second memory into the first memory, wherein the second data to be moved is determined on the basis of an instruction from the electronic device and on the basis of the information indicating the second data can be moved to the second memory described in the managing table.

2. The memory device according to claim 1, wherein the second data is data prepared when installing an application program or executing the application program.

3. The memory device according to claim 2, wherein when the second data is moved to the second memory, the program code of the application program is rejected from the first memory.

4. The memory device according to claim 2, wherein when the second data is moved to the second memory, the program code of the application program is left in the first memory.

5. The memory device according to claim 1, wherein the second data includes the data prepared when installing the application program or executing the application program and the program code of the application program.

6. The memory device according to claim 2, wherein the application program is downloaded in the first memory and installed in the first memory.

7. The memory device according to claim 2, wherein the application program is downloaded in the second memory and installed in the first memory.

8. The memory device according to claim 2, wherein the application program is downloaded in the second memory and installed in the second memory.

9. The memory device according to claim 1, wherein the second data and the signature information for the second data are encoded and moved to the second memory.

10. The memory device according to claim 1, wherein the first memory includes a saved information managing unit for managing saved information, the second data is encoded and moved, and the signature information of the encoded second data is stored in the saved information managing unit.

11. The memory device according to claim 1, wherein the second data is restored in accordance with a restoration instruction from the electronic device.

12. The memory device according to claim 1, wherein the second data related to the application program is restored in accordance with a start instruction of the application program from the electronic device.

13. The memory device according to claim 1, further comprising an inner CPU which can directly access to both the first memory and the second memory.

* * * * *

UNITED STATES PATENT AND TRADEMARK OFFICE
CERTIFICATE OF CORRECTION

PATENT NO. : 7,797,553 B2
APPLICATION NO. : 10/782556
DATED : September 14, 2010
INVENTOR(S) : Yoshihiko Takagi et al.

Figure 18A:
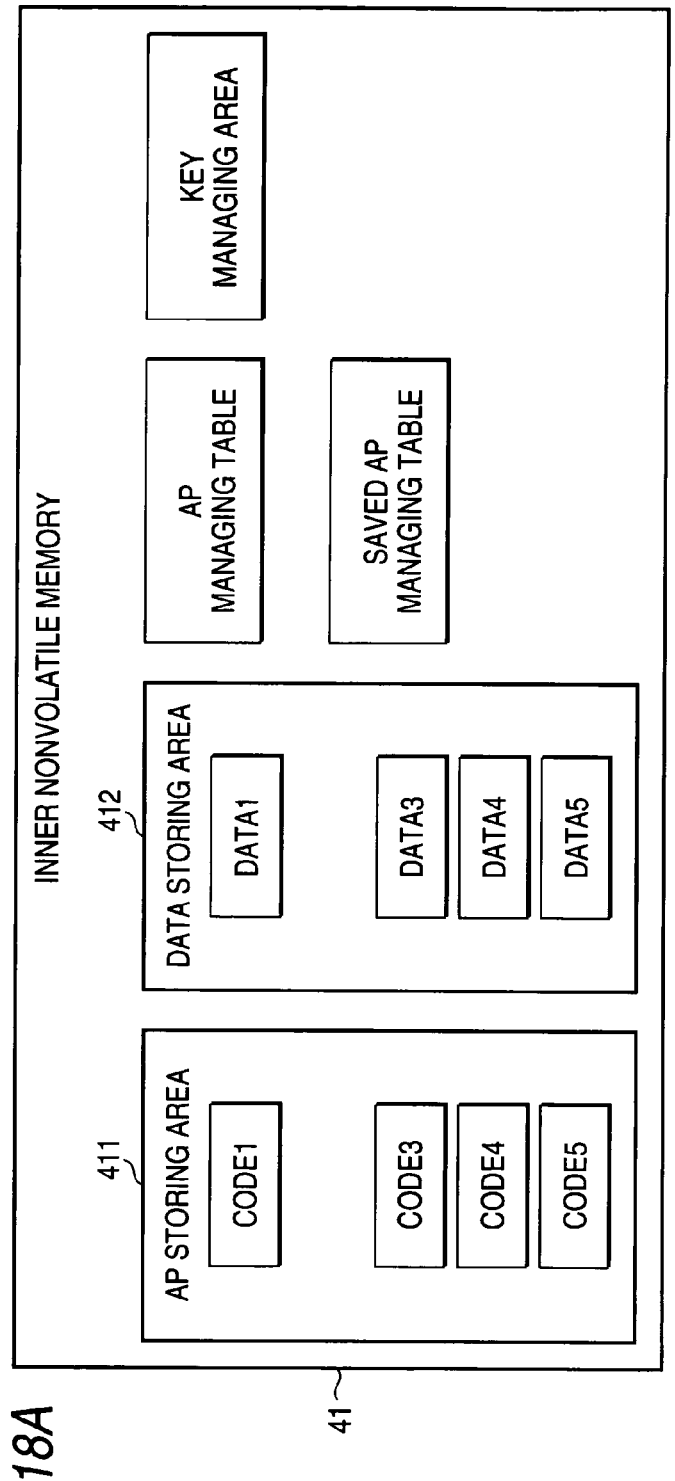
FIGS. 18A and 18B are views showing the transitions of the inner nonvolatile memory and the secure area of the secure card in the first embodiment of the present invention.
Figure 18B:
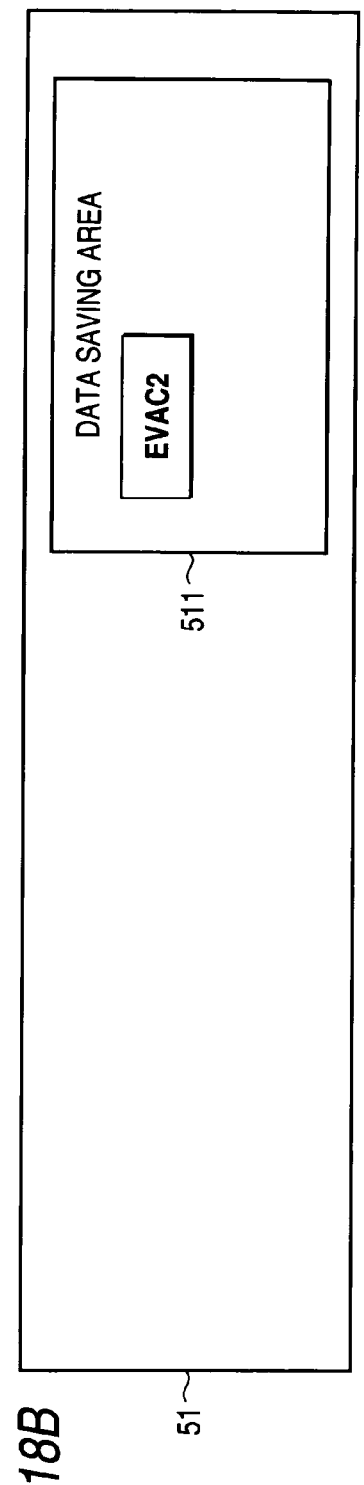

It is certified that error appears in the above-identified patent and that said Letters Patent is hereby corrected as shown below:

In column 8, line 1, please delete "FIG. 11 A" and instead insert --FIG. 18A--.

The line should read: "shown in FIG. 18A. The state of the data saving area 511 of".

Signed and Sealed this
Twenty-eighth Day of December, 2010

David J. Kappos
*Director of the United States Patent and Trademark Office*